(12) United States Patent
Ishikuri

(10) Patent No.: US 12,462,339 B2
(45) Date of Patent: Nov. 4, 2025

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Ryuichi Ishikuri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 414 days.

(21) Appl. No.: 18/161,909

(22) Filed: Jan. 31, 2023

(65) Prior Publication Data

US 2023/0245273 A1  Aug. 3, 2023

(30) Foreign Application Priority Data

Feb. 1, 2022  (JP) ................ 2022-014438

(51) Int. Cl.
*G06T 3/4053* (2024.01)
*G06N 5/04* (2023.01)
*G06N 20/00* (2019.01)
*G06T 7/215* (2017.01)

(52) U.S. Cl.
CPC ........... *G06T 3/4053* (2013.01); *G06N 5/04* (2013.01); *G06N 20/00* (2019.01); *G06T 7/215* (2017.01); *G06T 2207/20016* (2013.01); *G06T 2207/20081* (2013.01)

(58) Field of Classification Search
CPC .................................. G06T 3/4053
See application file for complete search history.

(56) References Cited

U.S. PATENT DOCUMENTS

| 2022/0198616 A1* | 6/2022 | Lee ........................ G06N 3/045 |
| 2023/0021463 A1* | 1/2023 | Chee ...................... G06T 5/00 |
| 2023/0245425 A1 | 8/2023 | Ishikuri |

FOREIGN PATENT DOCUMENTS

| JP | 2019-129328 A | 8/2019 |
| JP | 2019-204167 A | 11/2019 |

* cited by examiner

*Primary Examiner* — Di Xiao
(74) *Attorney, Agent, or Firm* — Carter, DeLuca & Farrell LLP

(57) ABSTRACT

An image processing apparatus generates a learning model for making an image high definition using teacher data selected from among a plurality of teacher data which use an image included in the first image group as one of a pair of images. The image processing apparatus calculates a degree of similarity between a current image selected as a high definition target from a second image group and a previous image which is a high definition target previous to the current image, infers high frequency components of the current image using the generated learning model when the degree of similarity is equal to or less than a threshold, and infers high frequency components of a current image using a learning model used to make the previous image high definition when the degree of similarity is greater than the threshold.

30 Claims, 20 Drawing Sheets

FIG. 5

DATABASE STRUCTURE

| INDEX | FRAME NUMBER OF MOVING IMAGE A | FRAME NUMBER OF MOVING IMAGE B |
|---|---|---|
| 1 | 1 | 2 |
| 2 | 2 | 5 |
| 3 | 3 | 8 |
| ⋮ | ⋮ | ⋮ |
| i-1 | n-1 | m-4 |
| i | n | m-1 |

IMAGE PROCESSING APPARATUS, IMAGE PROCESSING METHOD AND STORAGE MEDIUM

BACKGROUND OF THE INVENTION

Field of the Invention

The present invention relates to an image processing apparatus and method that uses machine learning to make image groups high definition and a storage medium.

Description of the Related Art

With super-resolution imaging using machine learning, when an image is enlarged and resolution conversion is performed, a high definition image can be generated by inferencing, using machine learning, the high frequency components unable to be estimated via linear interpolation processing of the pixel values. In super-resolution imaging, firstly, a learning model is generated using, as teacher data, an image group G and degraded images obtained by degrading the images of the image group G using a discretionary method. The learning model is generated by learning the differences in the pixel values between the original images and the degraded images and updating its own super-resolution processing parameters. When an image H with insufficient high frequency components is input into the learning model generated in this manner, the high frequency components are obtained by inferencing using the learning model. By superimposing the high frequency components obtained via inference on the image H, a high definition image can be generated. When executing super-resolution processing on moving images, high definition moving images can be generated by inputting all of the frames into the learning model one at a time.

Typically, when providing a product or service using a learning model, the processing to collect teacher data and generate a learning model is executed by the developer, and the generated learning model is provided to the user. Thus, at the time of learning processing, the content of the moving image that the user will input is unknown. Thus, on the developer side, a large number of images of many types and varieties with no bias in terms of image pattern are prepared as the teacher data and repeatedly used in learning so that inferencing at a uniform accuracy can be performed on all kinds of inference target moving images.

For example, in Japanese Patent Laid-Open No. 2019-204167 (Patent Document 1), a technique is described in which super-resolution processing is executed on a moving image using a learning model trained with a wide variety of images. However, since the teacher data includes a wide variety, there may be a very small amount of teacher data with a high degree of similarity to an inference target moving image Q specified by the user. When such a learning model is used, the result of learning using images with a low degree of similarity to the inference target moving image Q is reflected in the inference processing. As a result, improvements and the like are restricted to improvements to the sharpness by accentuating the edge of the subject, and accurately inferring high frequency components such as detailed patterns on the subject is difficult, meaning that the inference accuracy cannot be considered to be high.

An example of a system for solving such a problem is described in Japanese Patent Laid-Open No. 2019-129328 (Patent Document 2). The method described here includes performing learning on the user side using, as teacher data, only images that are similar to the inference target moving image in terms of imaging location, imaging conditions, and the like to obtain a moving image with a higher definition than when using a wide variety of images in learning.

In Patent Document 2, learning is performing using teacher data which has a common imaging location but different imaging times. More specifically, video previously captured in a section S of the route of a transit bus is collected and used in learning, and the resulting learning model is then used to execute inferencing for real time video of the section S. The teacher data in this case is limited to that captured in the section S. Accordingly, an image group with a relatively high degree of similarity to the inference target is obtained, meaning that improved inference accuracy can be expected. However, in the video captured in the section S, the imaging location is different in the video of the start point of the section S and the video of the end point of the section S. Thus, the captured subject is also very different, making it hard to say that similarity is high. This causes the inference accuracy of the overall section S to be reduced. In addition, in the previous video used as teacher data and the real time video of the inference target, the video may show the same point but the subject shown may be different. Since an accurate inference cannot be performed for unlearnt subjects, this also causes the inference accuracy to be reduced.

Also, as described in Patent Document 2, previous video is sorted into a plurality of groups by imaging conditions such as weather, and a plurality of learning models are generated by performing learning independently using the data of each group. This allows the learning model in use to be switched depending on the imaging conditions of the real time video. According to such a technique, a reduction in the inference accuracy caused by a difference in imaging conditions can be suppressed. However, even when conditions such as weather are the same, when the value of the illuminance level or the like is even slightly different, the frequency components are different between the teacher data and the inference target. Thus, it cannot be said that a reduction in the inference accuracy is sufficiently suppressed. For these reasons, the technique of Patent Document 2 cannot provide sufficient inference accuracy for high frequency components.

SUMMARY OF THE INVENTION

According to an aspect of the present invention, an image processing apparatus is provided that can make an image high definition with high accuracy using machine learning.

According to one aspect of the present invention, there is provided an image processing apparatus that uses a first image group to make an image of a second image group with fewer high frequency components than an image of the first image group high definition, comprising: a calculation unit configured to calculate a degree of similarity between a current image selected as a high definition target from the second image group and a previous image which is a high definition target previous to the current image; a selection unit configured to select, on a basis of the current image, teacher data to be used in learning from among a plurality of teacher data which use an image included in the first image group as one of a pair of images; a model generation unit configured to generate a learning model for making the current image high definition using the selected teacher data; an inference unit configured to infer high frequency components of the current image using the learning model generated by the model generation unit when the degree of similarity is equal to or less than a threshold and infer high frequency components of the current image using a learning model used to make the previous image high definition when the degree of similarity is greater than the threshold; and an image generation unit configured to generate a high definition image on a basis of the current image and the inferred high frequency components.

Further features of the present invention will become apparent from the following description of exemplary embodiments with reference to the attached drawings.

BRIEF DESCRIPTION OF THE DRAWINGS

FIG. 5 is a diagram illustrating an example of the data configuration of a candidate database according to the first embodiment.

DESCRIPTION OF THE EMBODIMENTS

Figure 1:
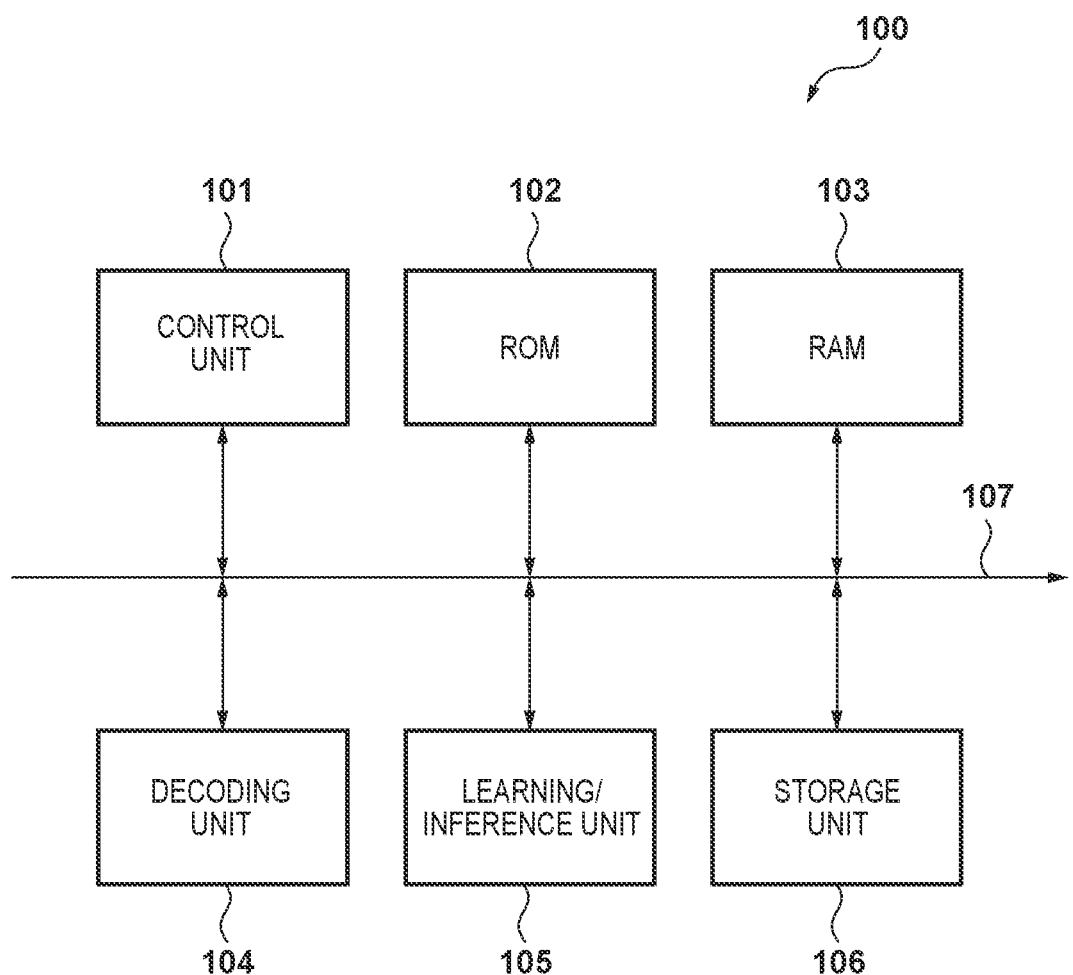
FIG. 1 is a block diagram illustrating the configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Overview of Image Processing Apparatus

An image processing apparatus of the first embodiment accepts as input two moving images, moving image A and moving image B, captured at the same time by the same image capture apparatus. The relationship between a resolution XA and a frame rate FA of the moving image A and a resolution XB and a frame rate FB of the moving image B corresponds to XA>XB and FA<FB. The image processing apparatus has the function (high definition moving image generation function) of generating a learning model using the frames of the moving image A and the moving image B and generating moving image C with the resolution XA and the frame rate FB from the moving image B via inference using the generated learning model.

Description of Configuration of Image Processing Apparatus

FIG. 1 is a block diagram illustrating an example of the hardware configuration of an image processing apparatus 100 according to the first embodiment. A control unit 101 is an arithmetic apparatus such as a Central Processing Unit (hereinafter, referred to as CPU). The control unit 101 implements various types of functions by loading programs stored in a Read Only Memory (hereinafter, referred to as ROM) 102 on the work area of a Random Access Memory (hereinafter, referred to as RAM) 103 and executing the programs. The control unit 101, for example, may function as various functional blocks including an analysis unit 211 and a decoded moving image generation unit 212 described below using FIG. 2 and a candidate obtaining unit 413 and a teacher data extraction unit 414 described below using FIG. 4. The ROM 102 stores a control program executed by the control unit 101. The RAM 103 is used as the working memory by the control unit 101 to execute programs, as a temporary storage area of various types of data, and the like.

A decoding unit 104 decodes the moving image or image data compressed in a coding format set by the Moving Picture Experts Group (hereinafter, abbreviated to MPEG) into uncompressed data. A learning/inference unit 105 includes a functional block (learning unit 451 described below using FIG. 4) that accepts teacher data as input and generates and updates the learning model. Also, the learning/inference unit 105 includes a functional block (inference unit 452 described below using FIG. 4) that generates a high definition image of an input image by analyzing the input image using the learning model generated via learning and inferring the high frequency components. In the present embodiment, as the learning model, a Convolutional Neural Network (hereinafter, abbreviated to CNN) model for super-resolution processing based on a convolutional neural network is used. This is used for enlarging the input image via linear interpolation, generating high frequency components to be added to the enlarged image, and adding and combining in both.

A storage unit 106 is constituted by a storage medium, such as a hard disk drive (HDD), a memory card, or the like, detachably connected to the image processing apparatus 100 and a storage medium control apparatus that controls the storage medium. The storage medium control apparatus, in accordance with commands from the control unit 101, controls storage medium initialization, data transfer between the storage medium and the RAM 103 for the reading and writing of data, and the like. A bus 107 is an information communication path connecting the functions. The control unit 101, the ROM 102, the RAM 103, the decoding unit 104, the learning/inference unit 105, and the storage unit 106 are communicatively connected to one another.

Note that the hardware blocks described in the present embodiment and the functional blocks implemented thereby do not need to have the configurations described above. For example, two or more blocks from among the control unit 101, the decoding unit 104, and the learning/inference unit 105 may be implemented by one piece of hardware. Also, the function of one functional block or the functions of a plurality of functional blocks may be executed by cooperation between two or more pieces of hardware. The functional blocks may be implemented by the CPU executing a computer program loaded on the memory or may be implemented by a dedicated piece of hardware. Also, one or more of the functional blocks may exist on a cloud server and be configured to transfer the processing result data via communication. For example, the decoding unit 104 may be implemented by the same CPU as the control unit 101 or may be implemented by a different CPU. Alternatively, the decoding unit 104 may be implemented by a Graphics Processing Unit (GPU) that operates by receiving instructions from the control unit 101. In another case, the decoding unit 104 may be implemented by hardware processing by an electronic circuit configured for combined processing. For example, the learning/inference unit 105 may be implemented by the same CPU as the control unit 101 or may be implemented by a different CPU. Alternatively, the learning/inference unit 105 may be implemented by a GPU that operates by receiving instructions from the control unit 101. In another case, the learning/inference unit 105 may be implemented by hardware processing by an electronic circuit configured for learning and inference.

Data Stored in Storage Medium and Decoding and Loading Method Therefor

Figure 2:
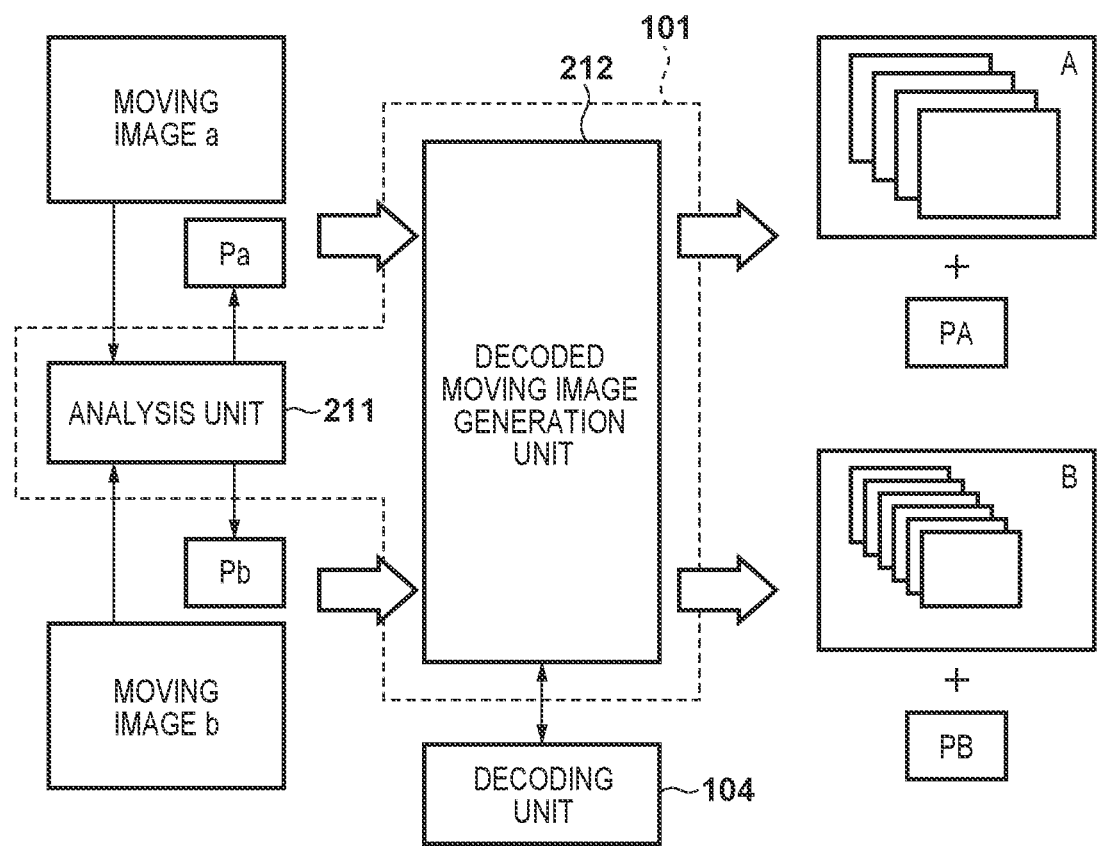
FIG. 2 is a diagram for describing the functional configuration of the image processing apparatus according to the first embodiment.

FIG. 2 is a diagram for describing the functional blocks for executing processing to load compressed moving image data via the control unit 101 (the analysis unit 211 and the decoded moving image generation unit 212). The storage unit 106 stores a moving image a and a moving image b, which are input data for high definition moving image generation processing. The term moving image used herein means one or more pieces of image data that are consecutive over time. The moving image a and the moving image b of the present embodiment are captured at the same time by an image capture apparatus with an image sensor and are compressed by the MPEG method. The moving image a and the moving image b may be generated by additionally executing thinning out or reduction processing on the images captured by a single image sensor or may be generated by capturing the same subject with image sensors with different resolutions and frame rates. Herein, the moving image a and the moving image b are two image groups obtained by executing different image processing on a single image captured by a single image sensor of a single image capture apparatus. The moving image data of the moving image a and the moving image b is compressed by the MPEG method, multiplexed together with the imaging time information, and stored in the MP4 format. Note that formats other than that described above may be used, as long as the image data from the storage unit 106 and the corresponding imaging time information can be obtained as a pair.

The analysis unit 211 has the function of parsing the moving image data (a MP4 file in the present example) stored in the storage unit 106 and calculating the storage position in the file of the compressed image data to be enclosed, time information registered as the metadata, and the like. With the MP4 format, position information indicating the storage position in the file of the frame data and the imaging time information is stored in the Moov portion. The analysis unit 211 loads the Moov portion of the moving image a from the storage unit 106 on the RAM 103 and parses the Moov portion and generates a table Pa including frame numbers of the moving image a, position information indicating the storage position of the frame data, and position information indicating the storage position of the imaging time. Also, the analysis unit 211 parses the Moov portion of the moving image b in a similar manner and generates a table Pb including frame numbers of the moving image b, position information indicating the storage position of the frame data, and position information indicating the storage position of the imaging time. The table Pa and the table Pb are held in the RAM 103.

Figure 3:
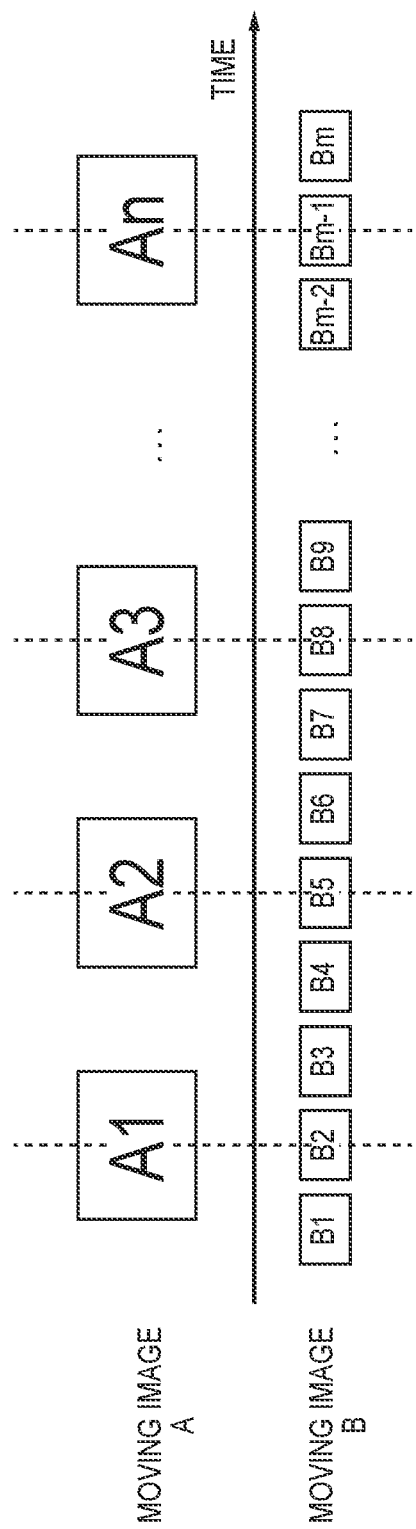
FIG. 3 is a diagram illustrating an example of the frame configuration of an input moving image according to the first embodiment.

Processing must be executed to convert the moving image a and the moving image b to an uncompressed format so that they can be used in high definition moving image generation processing. As illustrated in FIG. 2, the decoded moving image generation unit 212 of the control unit 101 decodes the moving image a and the moving image b, generates a moving image A and a moving image B, and stores them in the storage unit 106. More specifically, the decoded moving image generation unit 212 references the table Pa and the table Pb held in the RAM 103 and sequentially inputs the frame data of the moving image a and the moving image b stored in the storage unit 106 to the decoding unit 104. The decoded moving image generation unit 212 multiplexes the uncompressed format frame data output by the decoding unit 104 with the imaging time information obtained by referencing the table Pa and the table Pb and stores this in the storage unit 106. Herein, the moving image A is obtained by decoding the moving image a, and the moving image B is obtained by decoding the moving image b. Also, the decoded moving image generation unit 212 generates a table PA including frame numbers of the moving image A, position information indicating the storage position of the frame data, and position information indicating the storage position of the imaging time and stores this in the RAM 103. In a similar manner, the decoded moving image generation unit 212 generates a table PB including frame numbers of the moving image B, position information indicating the storage position of the frame data, and position information indicating the storage position of the imaging time and stores this in the RAM 103. An example of the frame configuration of the moving image A and the moving image B is illustrated in FIG. 3. In FIG. 3, n is the total frame number of the moving image A and m is the total frame number of the moving image B. The pairs (the pairs of images A1 and B2, A2 and B5, A3 and B8, and the like) of frames indicated by a dashed line are pairs of frames that include the same imaging time information, and this indicates that the images of these frames are captured at the same timing. Also, as described above, the relationship between the resolution XA of the moving image A and the resolution XB of the moving image B is XA>XB, and the relationship between the frame rate FA of the moving image A and the frame rate FB of the moving image B is FA<FB.

Next, the processing for generating a high definition image according to the present embodiment will be described. This processing is divided broadly into two parts, teacher data candidate obtaining processing and high definition moving image generation processing.

Figure 4:
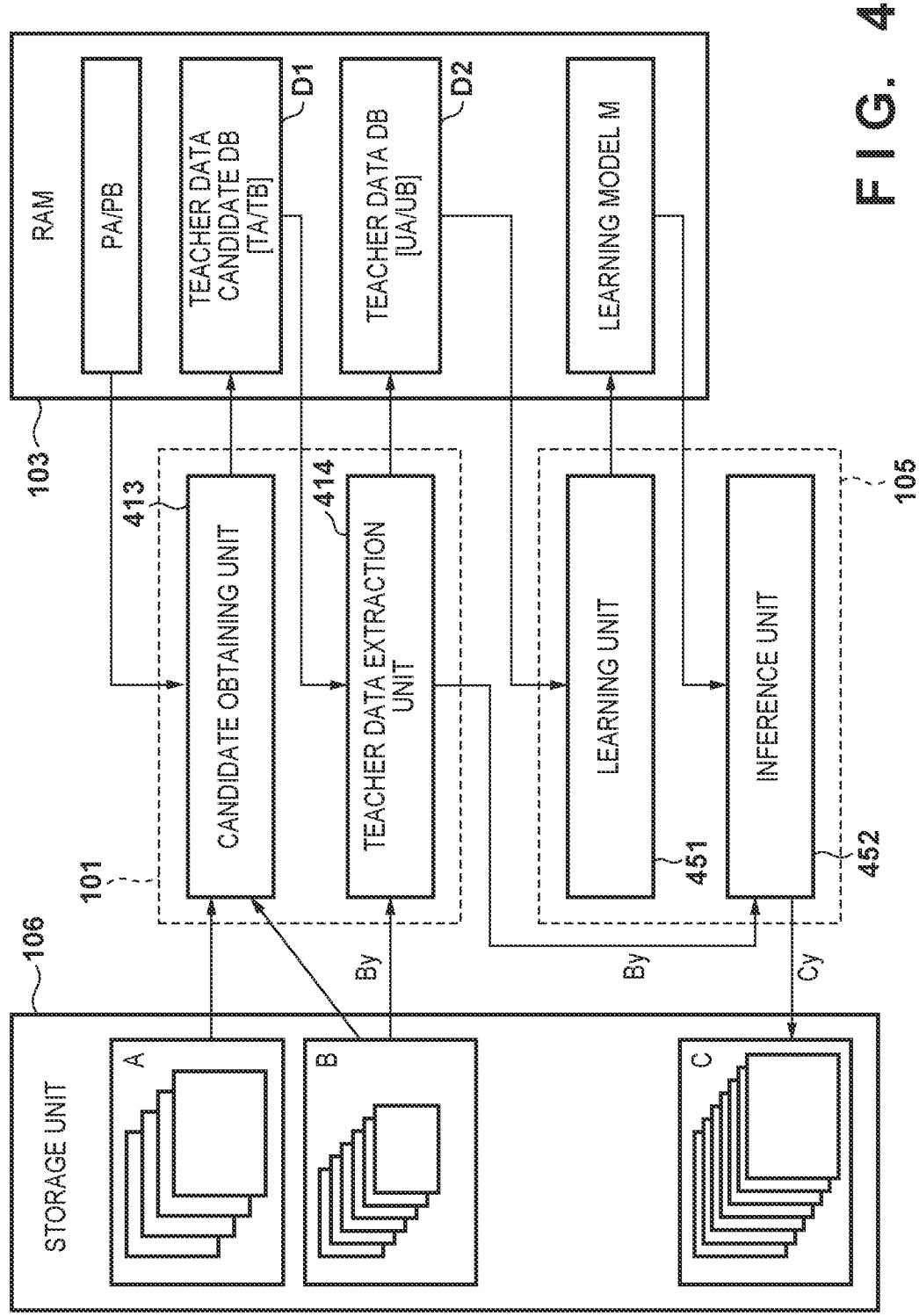
FIG. 4 is a diagram for describing the functional configuration of the image processing apparatus according to the first embodiment.

FIG. 4 is a diagram for describing the configuration and operations of the functional blocks relating to image processing executed by the image processing apparatus 100 of the first embodiment. As described in FIG. 2, the moving image A and the moving image B are held in the storage unit 106, and the table PA and the table PB are held in the RAM 103. The teacher data candidate obtaining processing is executed by the candidate obtaining unit 413. Also, the high definition moving image generation processing is executed by the teacher data extraction unit 414, the learning unit 451, and the inference unit 452. The candidate obtaining unit 413 extracts a pair of frames corresponding to a teacher data candidate for learning from the frame group of the moving image A and the frame group of the moving image B as a teacher data candidate and generates a teacher data candidate database (hereinafter, referred to as a candidate database D1). A frame By, which is a high resolution target and a high definition target, is obtained from the frame group of an image B. The teacher data extraction unit 414, in order to generate a learning model appropriate for the inference of high frequency components of the frame By, further extracts teacher data appropriate for learning from the teacher data candidate registered in the candidate database D1. The teacher data extraction unit 414 generates a teacher data database (hereinafter, referred to as a teacher database D2) using the extracted teacher data. The learning unit 451 of the learning/inference unit 105 uses the teacher database D2 and generates a learning model M for the frame By. The inference unit 452 inputs the frame By, which is high resolution target, into the learning model M generated by the learning unit 451 and executes high definition processing on the frame By. Hereinafter, the teacher data candidate obtaining processing and the high definition moving image generation processing will be described in more detail.

Teacher Data Candidate Obtaining Processing

In the teacher data candidate obtaining processing, the candidate database D1 is generated via the control unit 101 (candidate obtaining unit 413). In the first embodiment, the candidate obtaining unit 413 obtains, from the moving image A and the moving image B, a pair including a frame of the moving image A and a frame of the moving image B with a matching imaging time as the teacher data candidate. Specifically, all pairs (frame pairs indicated by a dashed line in FIG. 3) that share a common imaging time between the moving image A and the moving image B are obtained as teacher data candidates. The candidate obtaining unit 413 checks which frames can be used as teacher data before executing the learning processing described below, builds the candidate database D1, and registers the check results.

FIG. 5 is a diagram illustrating an example of the data configuration of the candidate database D1. In the candidate database D1, the frame numbers in the moving image files for a frame group TA able to be used as teacher data from the frame groups of the moving image A and a frame group TB able to be used as teacher data from the moving image B are registered. Here, the pairs (pairs of frame numbers) of frames with matching imaging time are associated together using an index I that is unique in the candidate database D1 and registered. For example, for the moving image A and the moving image B illustrated in FIG. 3, the pairs of frames A1 and B2, A2 and B5, and A3 and B8 (omitted hereinafter) are combined as frames captured at the same time. In the candidate database D1 illustrated in FIG. 5, these pairs are illustrated being stored by frame number and with a unique index I. In this manner, the obtained teacher data candidate is managed using the candidate database D1.

Figure 6:
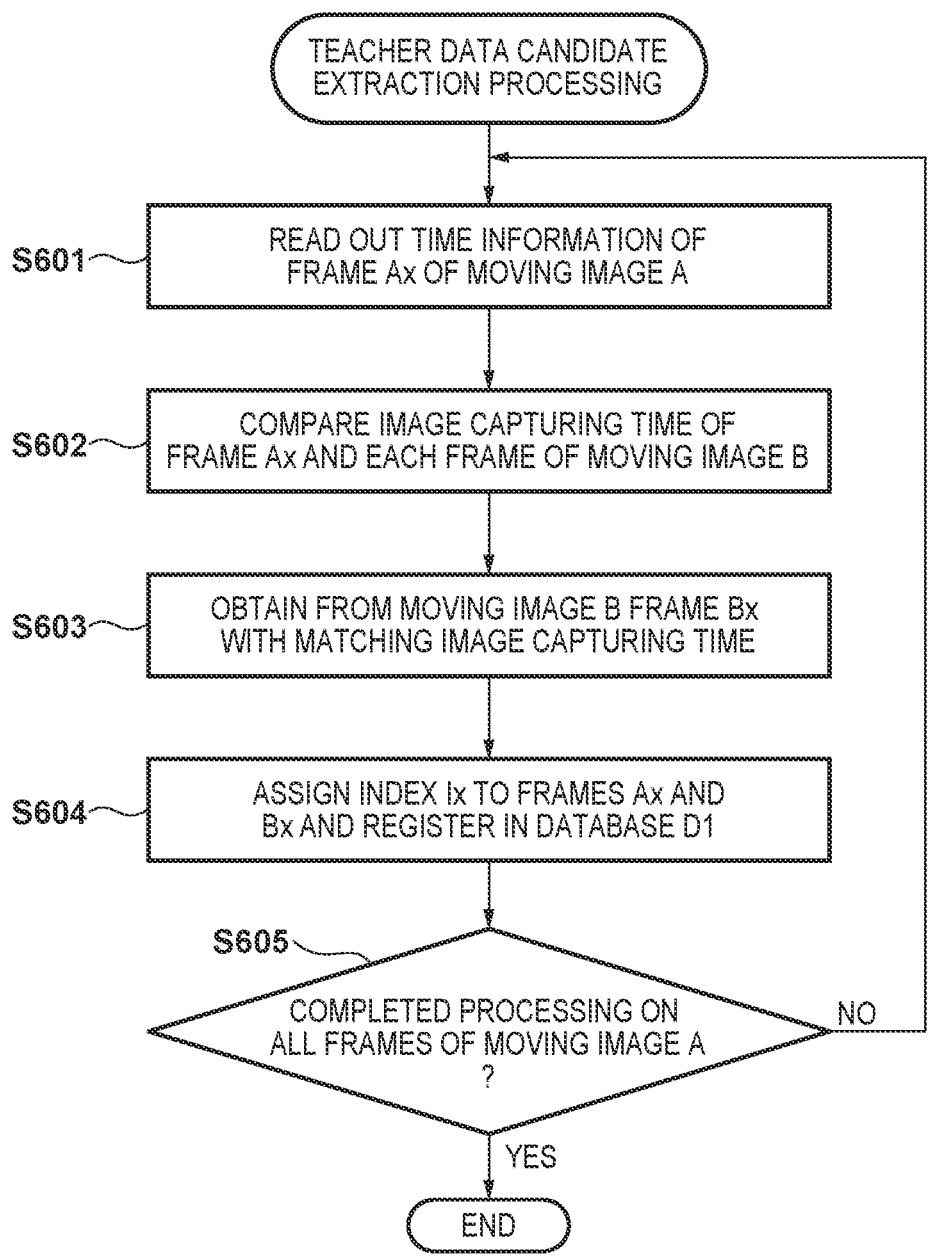
FIG. 6 is a flowchart of teacher data candidate obtaining processing according to the first embodiment.

The teacher data candidate obtaining processing described above will now be further described in detail using the flowchart of FIG. 6. In step S601, the candidate obtaining unit 413 selects one frame from the frames of the moving image A and obtains the time information corresponding to the selected frame from the table PA. In the present embodiment, the frames are selected in order from the top of the moving image A stored in the storage unit 106. Specifically, the candidate obtaining unit 413 selects one frame in order from the top of the moving image A stored in the storage unit 106. Hereinafter, the selected frame is referred to as frame Ax. The candidate obtaining unit 413 references the table PA stored in the RAM 103 and reads out the time information corresponding to the frame Ax from the storage unit 106 and transfers the time information to the RAM 103.

In step S602, the candidate obtaining unit 413 compares the time information of the frame Ax read out in step S601 and the time information of each frame of the moving image B. Specifically, the candidate obtaining unit 413 references the position information of the imaging time stored in the table PB, sequentially obtains the imaging time information of each frame of the moving image B from the storage unit 106, and compares them to the time information of the frame Ax. In step S603, the candidate obtaining unit 413 obtains the frame of the moving image B with an imaging time that matches the time information of the frame Ax and sets this as a frame Bx.

In step S604, the candidate obtaining unit 413 gives the combination of the frame Ax and the frame Bx described above an index Ix that is unique in the candidate database D1 and registers them in the candidate database D1. Specifically, the candidate obtaining unit 413 issues the unique index Ix to the combination of the frame Ax and the frame Bx and registers the index Ix, the frame number in the moving image A of the frame Ax, and the frame number in the moving image B of the frame Bx in the candidate database D1.

In step S605, the control unit 101 determines whether the processing of steps S601 to S604 described above has been completed on all of the frames of the moving image A. When the control unit 101 determines that the processing has been completed (YES in step S605), the processing ends. When the control unit 101 determines that the processing is not complete (NO in step S605), the processing returns to step S601 and the processing described above is executed for the next frame of the moving image A. The candidate database D1 is generated by this processing.

Note that in the present embodiment, in step S602, the pairs of frames to be registered in the candidate database D1 are determined via comparison of the imaging time. However, no such limitation is intended. For example, the frame Ax is reduced to the resolution XB and an indicator indicating the similarity between this and the image of each frame of the moving image B is used to perform similarity determination. The determination result then may be used to select a pair of frames to register in the candidate database D1. In this case, the candidate obtaining unit 413 has a degree of similarity determination function for determining the degree of similarity by comparing two or more pieces of image data. Note that as the indicator indicating the degree of similarity between images, Structural Similarity (SSIM) may be used, for example. Also, when obtaining the indicator indicating the degree of similarity, the image of the frame Ax is reduced to the resolution XB. However, no such limitation is intended. The image of the frame Ax may not be reduced, or the resolution after reduction may be a resolution other than XB.

High Definition Moving Image Generation Processing

Next, the high definition moving image generation processing executed by the control unit 101 (teacher data extraction unit 414) and the learning/inference unit 105 (learning unit 451 and inference unit 452) will be described. First, an overview of the high definition moving image generation processing will be described with reference to FIG. 4. The teacher data extraction unit 414 selects the teacher data appropriate for the learning for a learning model for the inference target frame By from the candidate database D1 and generates the teacher database D2 (FIG. 4) (the details thereof will be described below with reference to steps S702 to S703 in FIG. 7). The learning unit 451 generates a learning model using the extracted teacher data (step S704). Also, the inference unit 452 infers the high frequency components of the inference target frame By using the learning model and executes high definition processing (step S705) and obtains a frame (image) Cy by converting the inference target frame By to high definition. Note that before starting the high definition moving image generation processing, the control unit 101 generates the moving image C on the storage unit 106. When the generation of the high definition moving image starts, the moving image C is in an empty state without any frame data. The inference unit 452 sequentially stores the generated frame Cy in the moving image C.

Next, the processing for generating a high definition moving image described above will be described in detail with reference to the flowchart in FIG. 7. In step S701, the teacher data extraction unit 414 reads out one frame as the high definition target frame from the moving image B. In the present embodiment, the teacher data extraction unit 414 reads out frames one frame at a time in order from the top of the moving image B stored in the storage unit 106. Hereinafter, the frame read out in step S701 is defined as the frame By. More specifically, the teacher data extraction unit 414 references the table PB and reads out the frame data and the imaging time information of the frame By from the storage unit 106 and transfers this to the RAM 103.

In step S702, the teacher data extraction unit 414, from among the teacher data candidates TB registered in the candidate database D1, extracts frames for which a difference in imaging time with the frame By is less than a threshold set in advance in the system and registers these in the teacher database D2. As the threshold, the display period of one frame of the moving image A (display period of one frame via the frame rate XA) can be used, for example. The structure of the teacher database D2 is similar to that of the candidate database D1 (FIG. 5). Specifically, first, the teacher data extraction unit 414 references the position information of the table PB and obtains the time information of each frame group TB registered in the candidate database D1. Then, the teacher data extraction unit 414 compares each piece of obtained time information with the time information of the frame By, extracts frames with a difference between the two that is less than the threshold from the frame group TB, and registers them in the teacher database D2 on the RAM 103. Hereinafter, the frame group of the moving image B registered in the teacher database D2 by this processing is denoted by UB. Note that in the present embodiment, when building the teacher database D2, the frame group which has a difference in imaging time with the frame By that is less than the threshold is extracted from the candidate database D1. However, no such limitation is intended. Using the indicator indicating the degree of similarity with the frame By, the frame group UB may be extracted. For example, the teacher data extraction unit 414, using SSIM, may extract, from the frame group TB the frame group with an indicator for degree of similarity with the frame By that is higher than a threshold set in advance in the system and register this as the frame group UB.

In step S703, the teacher data extraction unit 414 registers, in the teacher database D2, the frame of the frame group TA corresponding to the pair for each frame of the frame group UB in the candidate database D1. Specifically, the teacher data extraction unit 414 references the candidate database D1 on the RAM 103 and registers, in the teacher database D2, the frames of the frame group TA associated via the index I with each frame of the frame group UB. At this time, the combinations of the two associated frames are not changed, and an index J that is unique in the teacher database D2 is assigned to each combination. Hereinafter, the frame group of the moving image A registered in the teacher database D2 is denoted by UA.

In step S704, the learning unit 451 performs learning using the teacher data (frame group UA and frame group UB) registered in the teacher database D2 and generates the learning model M.

Figure 8:
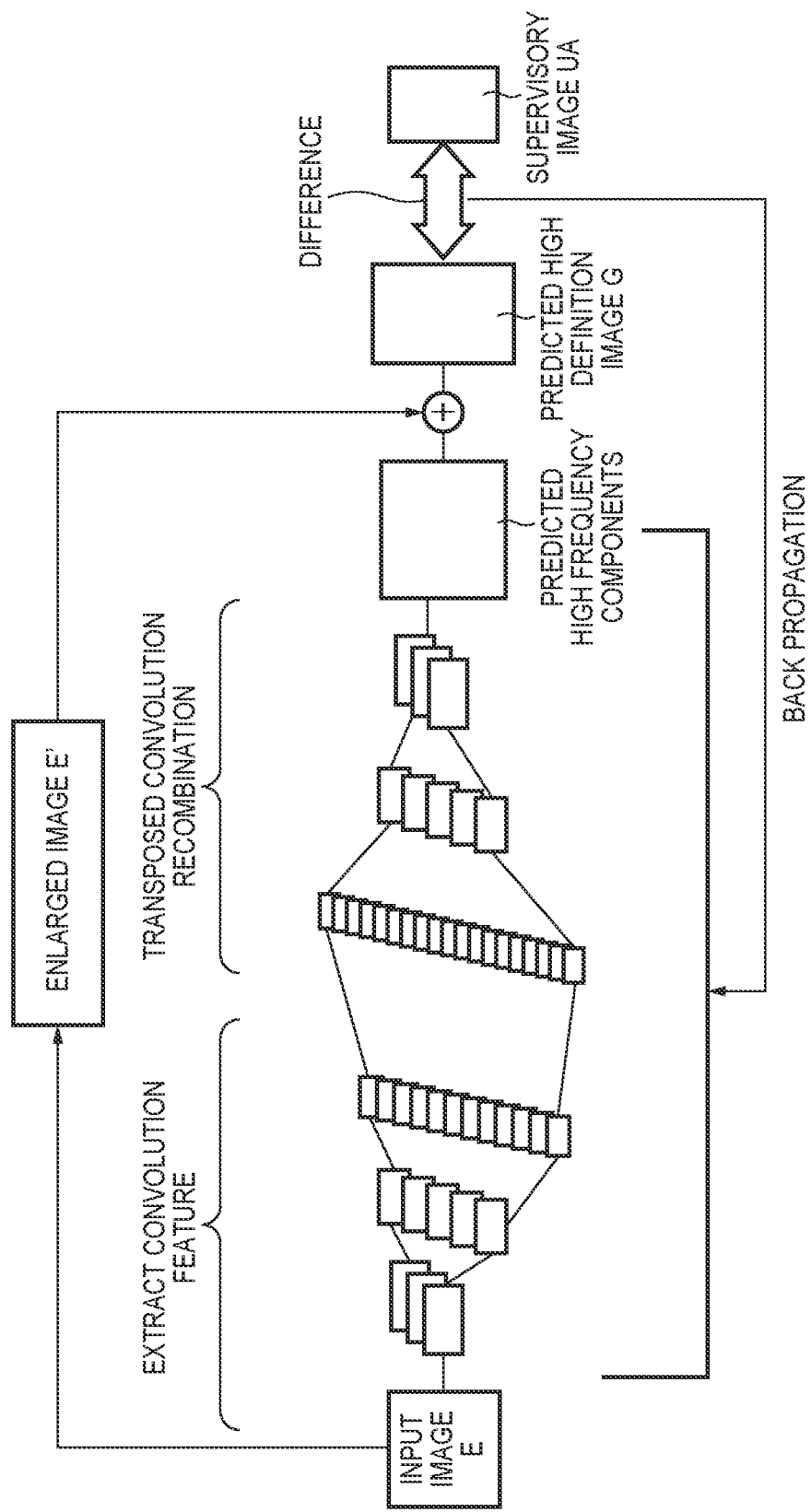
FIG. 8 is a schematic diagram for describing a learning/inference process according to the first embodiment.

FIG. 8 is a diagram schematically illustrating the learning model generation function of the learning unit 451. The learning model generation function includes a learning process and an inference process, and the inference process is divided into a feature extraction process using a filter including a CNN and a re-configure process. First, in the feature extraction process, the learning unit 451 inputs a single image (defined as image E) from the frame group UB into the CNN, extracts a convolution feature via the CNN, and generates a plurality of feature maps. Next, in the re-configure process, the learning unit 451 performs upsampling via a transposed convolution of all of the feature maps and generates predicted high frequency components. In the re-configure process, also, the learning unit 451 re-configures the image by adding the predicted high frequency components to an image E' obtained by enlarging the image E via the bicubic method or the like and generates an estimated high definition image G. In the learning process, the learning unit 451 compares the estimated high definition image G generated in the inference process described above and the image H corresponding to the image E from the frame group UA and performs fine-tuning of the learning model M by the backpropagation method using the difference between the two. The learning unit 451 improves the inference accuracy by repeating this processing on the same image E a predetermined number of times. By executing the series of processing described above on each image of the frame group UB, the learning model M appropriate for inference processing of the frame group UB is built.

As described above, the learning unit 451 references the teacher database D2, the table PA, and the table PB and reads out the frame data of the frame pair registered as teacher data from the storage unit 106 and executes the learning model generation function described above. The learning unit 451 stores the learning model M generated by the learning model generation function in the RAM 103.

In step S705, the inference unit 452 generates the high definition frame Cy from the frame By via inference using the learning model M generated in step S704. Specifically, first, the inference unit 452 reads out the learning model M stored in the RAM 103. Next, the inference unit 452 inputs the frame data (image) of the frame By held in the RAM 103 in step S701 into the CNN of the learning model M and generates high frequency components expected when enlarging the image of the frame By to the resolution XA. The inference unit 452 adds the generated high frequency components to the image obtained by linearly enlarging the image of the frame By to the resolution XA to generate an image of the high definition frame Cy at the resolution XA and stores this in the RAM 103. Note that the processing from the high frequency component inference to the high definition image generation executed for the frame By is processing similar to that of the inference process described above using FIG. 8. The inference unit 452 adds the frame data of the high definition frame Cy stored in the RAM 103 to the end of the high definition moving image C on the storage unit 106. Also, the imaging time information of the frame By is replicated and multiplexed as the imaging time of the high definition frame Cy and stored in the moving image C.

In step S706, the control unit 101 determines whether or not the processing described above has been completed on the frame (this may be all of the frames of the moving image B or a portion of the frames) of the inference target range of the moving image B. When the control unit 101 determines that the processing is not complete (NO in step S706), the processing proceeds to step S701, the next frame of the moving image B is selected by the teacher data extraction unit 414 as the frame By, and the processing described above is repeated. When the control unit 101 determines that the processing is complete (YES in step S706), the present processing ends. As described above, when the high definition moving image generation processing ends, the high definition moving image C with the resolution XA and the frame rate FB is stored in an uncompressed format in the storage unit 106.

Note that in the embodiment described above, each one of the functional blocks are implemented by the control unit 101 only or the learning/inference unit 105 only. However, no such limitation is intended. For example, each functional block may be implemented via cooperation between the control unit 101 and the learning/inference unit 105. For example, the function of the inference unit 452 may be implemented by the control unit 101 and the learning/inference unit 105, and the processing to store the high definition frame Cy and the imaging time in the moving image C on the storage unit 106 may be executed by the control unit 101.

Also, in the present embodiment, the teacher data candidate obtaining processing is executed before executing the learning processing and the high definition moving image generation processing for all of the moving images, but the teacher data candidate obtaining processing may be executed in parallel with the high definition moving image generation processing. Also, in the present embodiment, in step S704, the learning model M is newly generated for each inference target frame and the previously generated one is discarded. However, no such limitation is intended. For example, in advance, a learning model M' trained externally may be loaded, and addition learning using the frame group UA and the frame group UB may be performed in step S704 on the loaded learning model M'.

As described above, according to the first embodiment, the learning model M trained using an image group, from among image groups captured in the same imaging period, similar to the high definition target image is used. This allows the image to be made high definition with high accuracy.

Also, a pair of images of the same time from the two image groups are used as the teacher data. This enables learning of an even higher accuracy.

Second Embodiment

Figure 9:
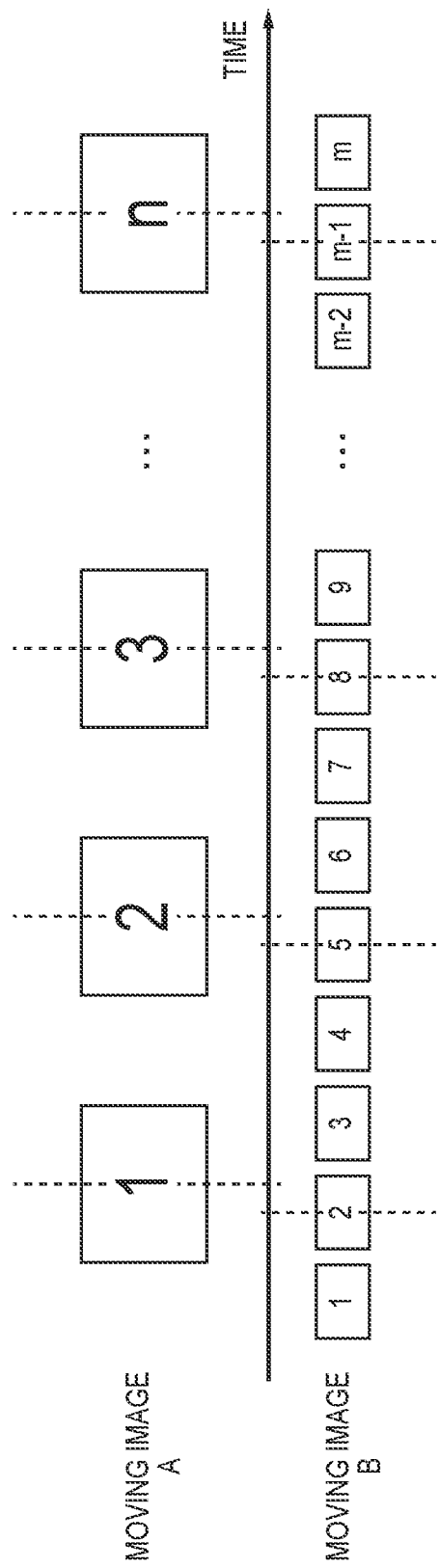
FIG. 9 is a diagram illustrating an example of the frame configuration of an input moving image according to a second embodiment.

In the processing for obtaining the teacher data candidate in the first embodiment, a combination of a frame of the moving image A and a frame of the moving image B with matching imaging time is registered in the candidate database D1. When the moving image A and the moving image B are obtained from moving images captured at the same time using the same image sensor of a single image capture apparatus, as illustrated in FIG. 3, frames with the same imaging time can be obtained from the moving image A and the moving image B. However, with this method, when the moving image A and the moving image B are moving images captured in the same imaging period by a plurality of image sensors, the extraction of a teacher data candidate may not be appropriately performed. This is because, as illustrated in FIG. 9, for a frame of the moving image A, there is not always a frame in the moving image B with a matching imaging time. Note that examples of a configuration for capturing the moving image A and the moving image B via a plurality of image sensors include a configuration in which image capture is performed using an image capture apparatus including a plurality of image sensors, a configuration in which image capture is performed using a plurality of image capture apparatuses each with one or more image sensors, and the like. In the processing for obtaining the teacher data candidate in the second embodiment, the problem described above is solved by, even if the imaging time of the frame of the moving image A and the frame of the moving image B do not match, a combination of frames with a difference in time that is less than a predetermined threshold is registered in the candidate database D1.

Figure 10:
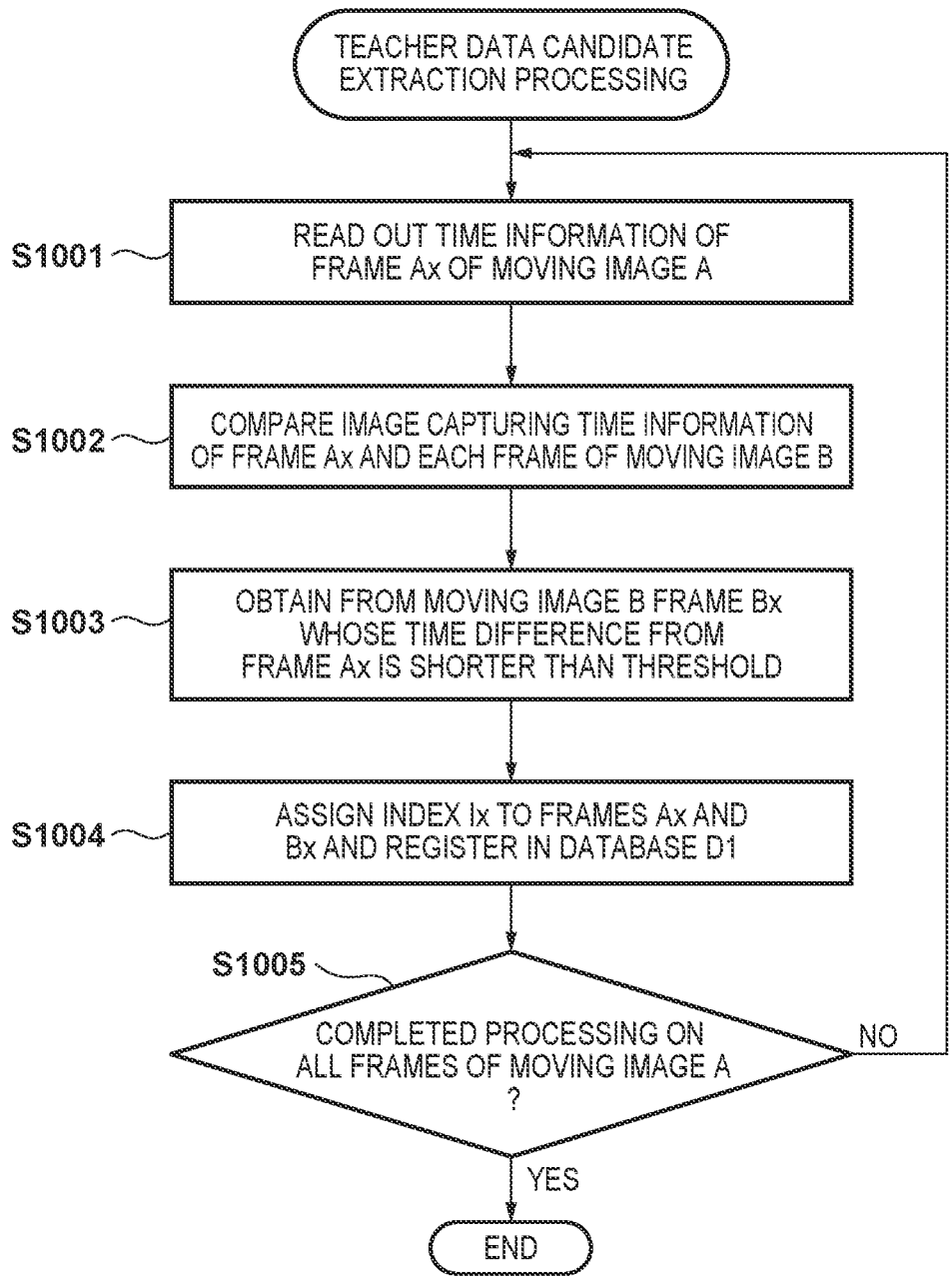
FIG. 10 is a flowchart of teacher data candidate obtaining processing according to the second embodiment.

In the second embodiment, the configuration of the image processing apparatus 100 and the high definition image generation processing is similar to that in the first embodiment, but a portion of the processing for obtaining the teacher data candidate is different. FIG. 10 is a flowchart for describing the processing for obtaining the teacher data candidate according to the second embodiment. Hereinafter, mainly the parts that are different from the processing for obtaining the teacher data candidate in the first embodiment (FIG. 6) will be described.

The processing of steps S1001 to S1002 is similar to the steps S601 to S602 of the first embodiment (FIG. 6). In step S1003, the candidate obtaining unit 413 obtains, from among the frames of the moving image B, a frame with a difference in imaging time to the one frame Ax of the moving image A that is less than the predetermined threshold as the frame Bx and registers this in the candidate database D1 on the RAM 103. Note that as the threshold, the display period per frame at the frame rate XB of the moving image B may be used, for example. The subsequent processing of steps S1004 to S1005 is similar to the steps S604 to S605 of the first embodiment (FIG. 6).

In this manner, according to the second embodiment, even when the moving image A and the moving image B are obtained by a plurality of image sensors, extraction of the teacher data candidate can be appropriately performed.

Third Embodiment

Figure 11:
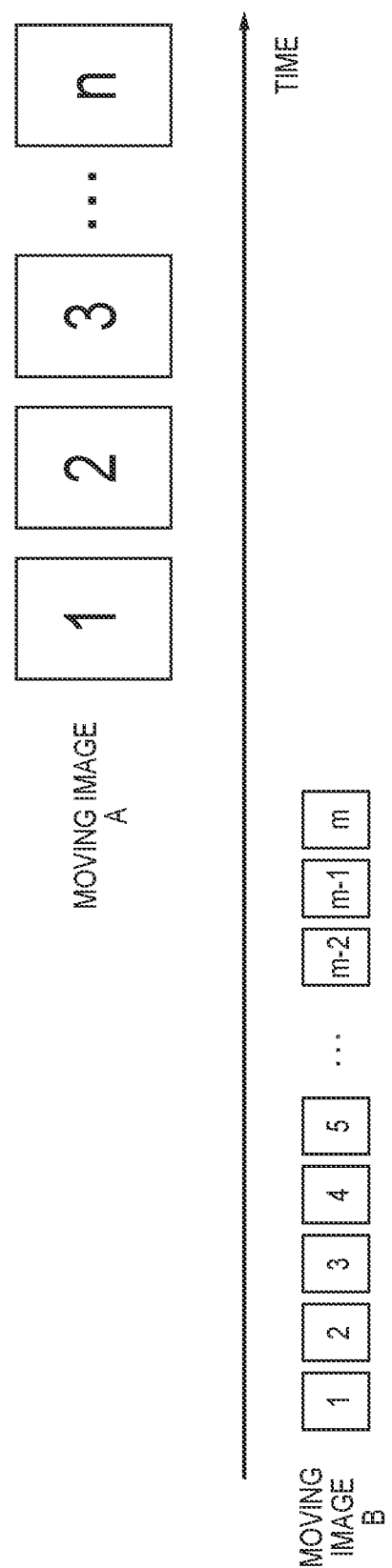
FIG. 11 is a diagram illustrating an example of the frame configuration of an input moving image according to a third embodiment.

In the first embodiment and the second embodiment, the moving image A and the moving image B are captured at least in the same imaging period. Thus, in the teacher data candidate obtaining processing of the first embodiment and the second embodiment, as illustrated in FIG. 11, when the moving image A and the moving image B are captured at different times (imaging periods that do not overlap) by the same or a plurality of image capture apparatuses, the teacher data candidate cannot be obtained. In the third embodiment, the teacher data candidate obtaining processing for appropriately obtaining the teacher data candidate for the moving image A and the moving image B as illustrated in FIG. 11 will be described.

In the processing for obtaining the teacher data candidate according to the third embodiment, an indicator indicating the degree of similarity of the frame between the frame of the moving image A and the frame of the moving image B is calculated and the pair of frames with an indicator equal to or greater than a threshold set in advance in the system is registered in the candidate database D1. Note that as the indicator indicating the degree of similarity of the frame, SSIM can be used as described above, for example. Also, in determining the similarity, the image of the frame of the moving image A may be reduced to the resolution XB, and the indicator indicating the degree of similarity may be calculated using this and the image of each frame of the moving image B. However, at this time, the image of the frame of the moving image A may not be reduced, or the resolution after reduction may be a resolution other than XB.

Figure 12:
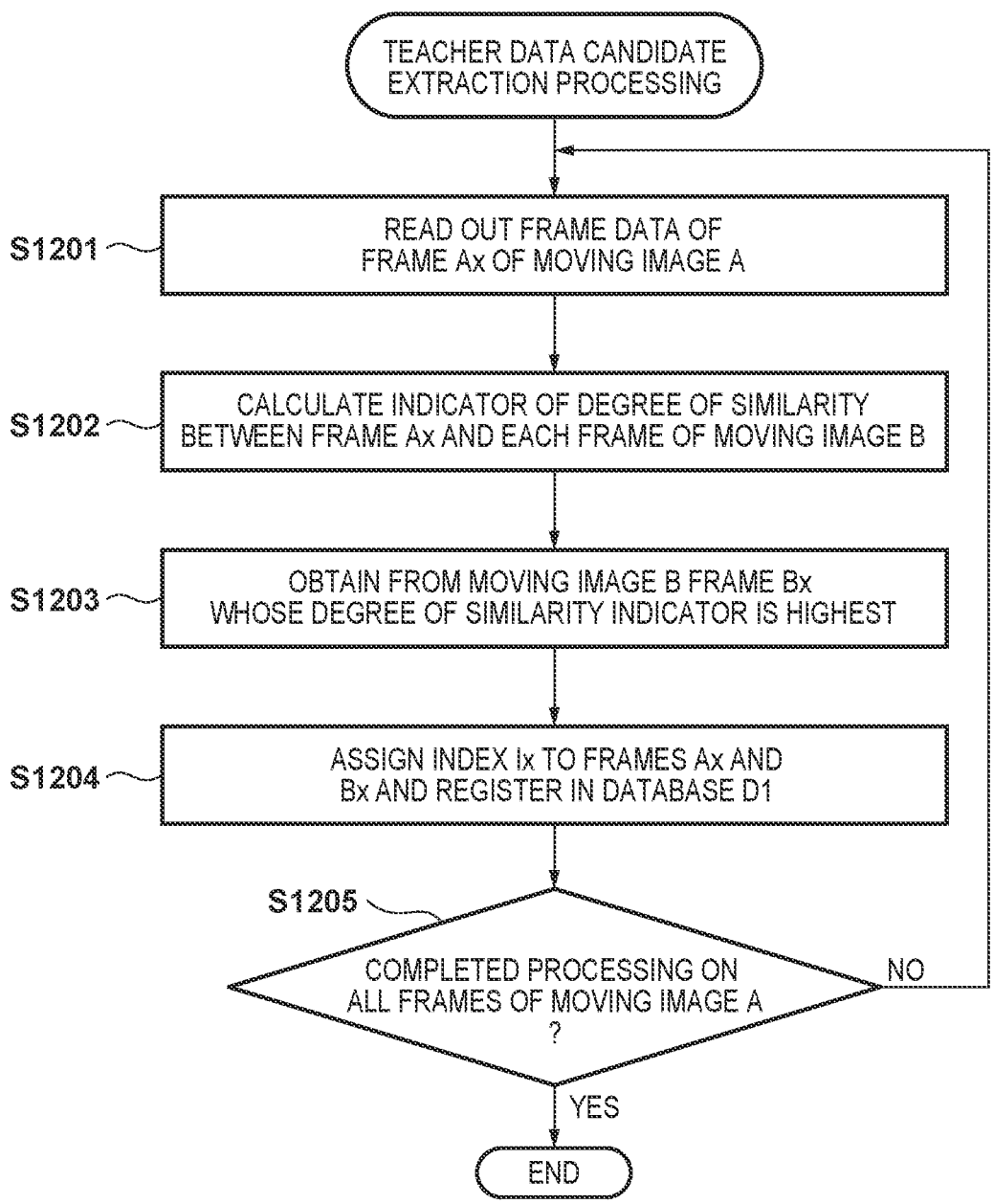
FIG. 12 is a flowchart of teacher data candidate obtaining processing according to the third embodiment.

FIG. 12 is a flowchart for describing the processing for obtaining the teacher data candidate according to the third embodiment. Hereinafter, mainly the parts that are different from the processing for obtaining the teacher data candidate in the first embodiment (FIG. 6) will be described with reference to FIG. 12.

In step S1201, the candidate obtaining unit 413 selects one frame from the frames of the moving image A and loads the frame data of the selected frame. The candidate obtaining unit 413 selects one frame in order from the top of the moving image A stored in the storage unit 106 (hereinafter, the selected frame is referred to as the frame Ax). The candidate obtaining unit 413 references the table PA stored in the RAM 103 and transfers the frame data of the selected frame Ax from the storage unit 106 to the RAM 103.

In step S1202, the candidate obtaining unit 413 calculates the degree of similarity between the frame Ax read out in step S1201 and each frame of the moving image B. More specifically, the candidate obtaining unit 413 references the position information (relating to the frame data) of the table PB and sequentially obtains the frame data of each frame of the moving image B from the storage unit 106 to the RAM 103. Then, the candidate obtaining unit 413 calculates the degree of similarity indicator between the frame Ax and each frame using the degree of similarity indicator calculation function (SSIM in the present embodiment) and stores this in the RAM 103. In step S1203, the candidate obtaining unit 413 obtains the frame of the moving image B with the highest value from among the degree of similarity indicators calculated in step S1202 as the frame Bx. The subsequent processing of steps S1204 to S1205 is similar to the steps S604 to S605 of the first embodiment (FIG. 6).

As described above, according to the third embodiment, even when the imaging period of two image groups (the moving image A and the moving image B) do not overlap, the teacher data candidate can be appropriately obtained.

Fourth Embodiment

In the fourth embodiment, for the learning processing of the first to third embodiment, performance improvement of the learning model M taking into consideration image similarity will be described. As described in the first embodiment, appropriate teacher data is extracted for the frame By selected in step S701 of FIG. 7, and the teacher data is used in step S704 to generate or update the learning model M. When generating or updating the learning model M, as illustrated in FIG. 8, the network parameter is tuned using backpropagation. In the fourth embodiment, the strength of the tuning via backpropagation is controlled on the basis of an attribute (for example, imaging time) of the frame (image E) used in the learning and the frame By, which is the high resolution or high definition target, or the image of these frames. More specifically, the learning unit 451 sets the coefficient so that, in the learning process, when the similarity between the frame By and each frame of the frame group UB sequentially input is high, the effects on the network parameter update are strong and when low, the effects are weak. Here, the similarity between frames may be simply determined on the basis of the time difference between the frame By and the input image E or may be determined by comparing the images of both frames using SSIM or the like. In an example configuration when using the former (a method using the time difference), as described below, when the time difference is less than the threshold, the strength of the tuning is multiplied by the coefficient of 1 and when the time difference is equal to or greater than the threshold, the strength of the tuning is multiplied by the coefficient of 0.5.

if (ABS(time difference between By and $E$)<threshold){coefficient=1} else{coefficient=0.5}

In an example configuration when using the latter (a method using similarity), as described below, SSIM is used as the coefficient of the tuning strength.

Coefficient=SSIM(By and $E$)[0≤SSIM($x$)≤1]

Note that examples of how to apply the strong or weak effect include a method of multiplying an update rate of the network parameter using backpropagation in the learning process by the coefficient described above, a method of multiplying the number of times a learning loop has been performed on the input image E by the coefficient without multiplying the parameter update rate by the coefficient, and the like.

Fifth Embodiment

The first to third embodiments described above have a configuration in which a pair including a frame from the moving image A and a frame from the moving image B is extracted as the teacher data candidate and registered in the candidate database D1. In the fifth embodiment, the moving image A is converted to the resolution XB of the moving image B to generate a moving image A', and the candidate obtaining unit 413 obtains the teacher data candidate using the moving image A and the moving image A'. In other words, the candidate obtaining unit 413 of the fifth embodiment extracts a frame Ax' with the same frame number as the frame Ax of the moving image A from the moving image A' and registers the pair including the frame Ax and the frame Ax' as the teacher data candidate in the candidate database D1. The fifth embodiment will be described below in detail. Description of Configuration of Image Processing Apparatus 100

The hardware configuration and functional configuration of the image processing apparatus 100 is similar to that of the first embodiment (FIG. 1). However, the control unit 101 of the fifth embodiment also has a resolution conversion function for reducing and converting the resolution of an image via the bicubic method. The resolution conversion function calculates the pixel value of the pixels requiring interpolation when executing resolution reduction processing on the image data stored in the RAM 103 by referencing the surrounding pixels.

Data stored in Storage Unit 106 and Decoding and Loading Method Therefor

In the first embodiment, the moving image a and the moving image b stored in the storage unit 106 are converted to an uncompressed format, and the moving image A obtained by decoding the moving image a and the moving image B obtained by decoding the moving image b are stored in the storage unit 106. In the fifth embodiment, further, the moving image A' is generated by converting the moving image A to the resolution XB of the moving image B. More specifically, the control unit 101 references the table PA stored in the RAM 103 and sequentially inputs the frame data of the frame (hereinafter, referred to as frame K) of the moving image A stored in the storage unit 106 into the resolution conversion function of the control unit 101. Then, using the resolution conversion function, a frame (hereinafter, referred to as frame K') of the frame data of the resolution XB is output. The control unit 101 references the table PA and multiplexes this with the imaging time information of the frame K read out from the storage unit 106 and stores this in the storage unit 106 as the frame of the moving image A'. Also, a table PA' holding the frame number of each frame of the moving image A', the position information indicating the storage position of the frame data, and the position information indicating the storage position of the imaging time data is stored in the RAM 103.

Figure 13:
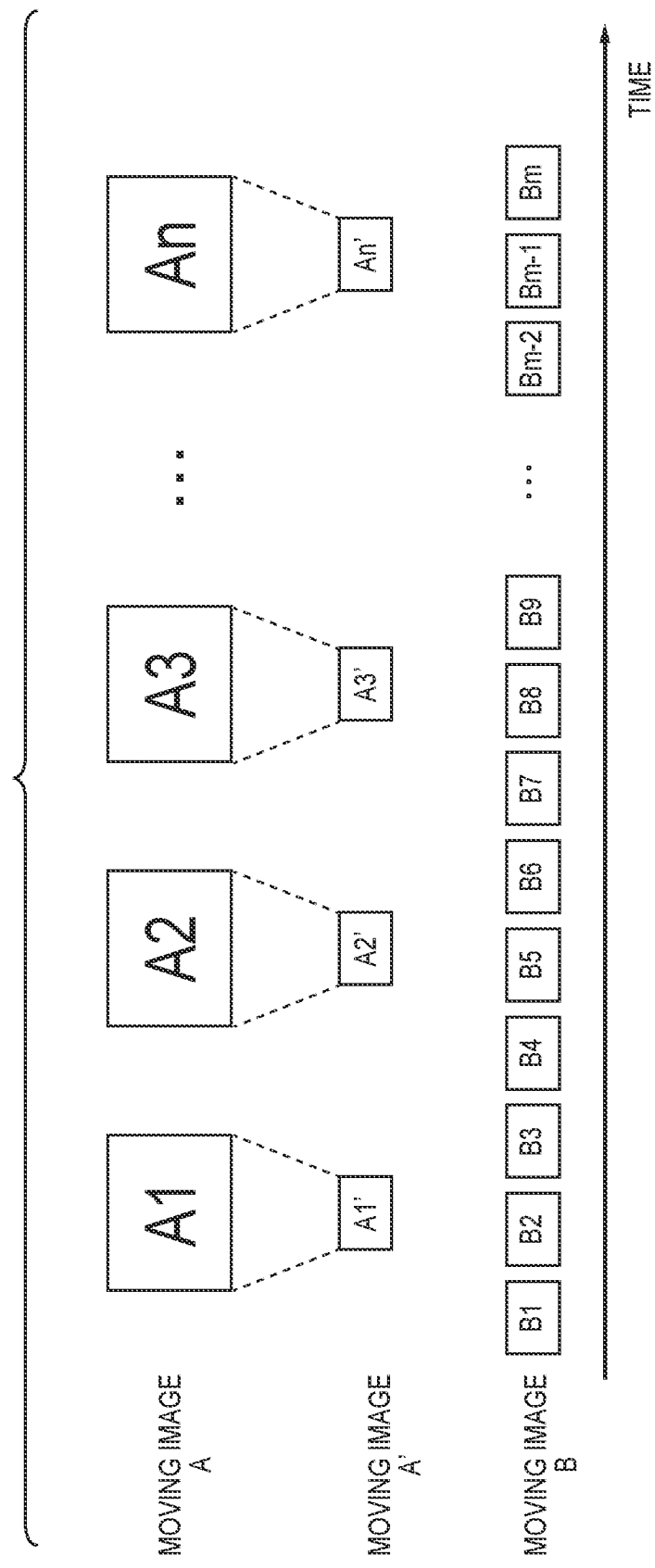
FIG. 13 is a diagram illustrating an example of the frame configuration of a moving image according to a fifth embodiment.

Examples of the moving image A, the moving image B, and the moving image A' are illustrated in FIG. 13. The images (A1' to An') generated by reducing the resolution of the images (A1 to An) of each frame of the moving image A to the resolution XB are stored in the storage unit 106 as the moving image A'. Note that in the example described above, the resolution of the moving image A is reduced to XB, but no such limitation is intended. It is sufficient that the moving image A' includes an image converted to a resolution lower than the resolution of the moving image A. However, by using an image converted to a resolution which is the same as that of the high definition target image, a learning model more appropriate for the high definition target image can be built.

Teacher Data Candidate Obtaining Processing

Figure 14:
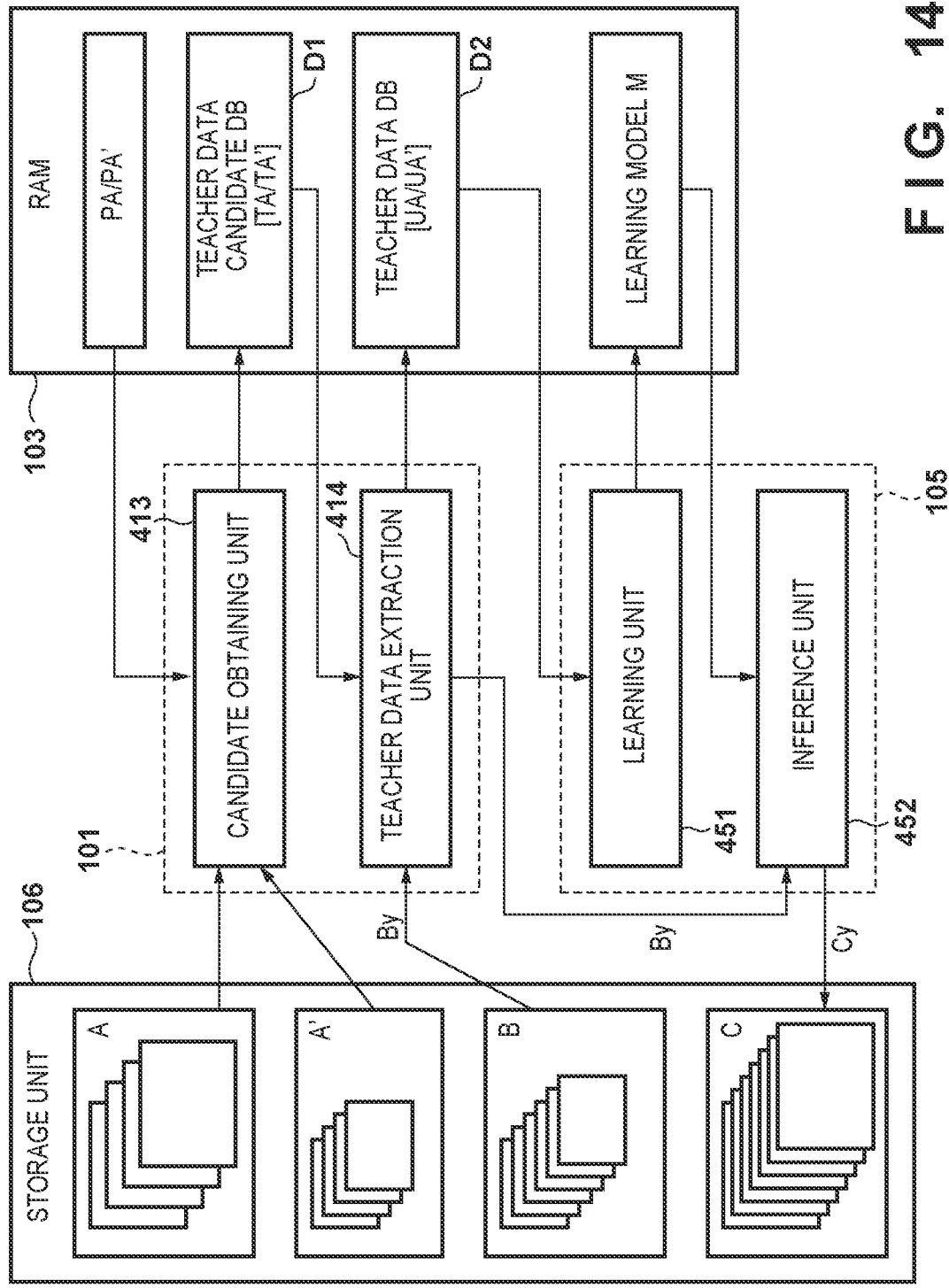
FIG. 14 is a diagram for describing the functional configuration of the image processing apparatus according to the fifth embodiment.

FIG. 14 is a diagram illustrating the configuration and operations of the functional blocks relating to image processing executed by the image processing apparatus 100 of the fifth embodiment. The candidate obtaining unit 413 obtains a combination of frames with the same frame number for each frame of the moving image A and the moving image A' and registers this in the candidate database D1. More specifically, for each frame of the moving image A listed in the table PA, the candidate obtaining unit 413 searches for a frame with a matching frame number in the moving image A' by referencing the table PA'. The candidate obtaining unit 413 assigns a unique index I to the combination of frames of the moving image A and the moving image A' with the same frame number and registers this in the candidate database D1. The frame group of the moving image A registered in the candidate database D1 is denoted by TA, and the frame group of the moving image A' is denoted by TA'.

High Definition Moving Image Generation Processing

Figure 15:
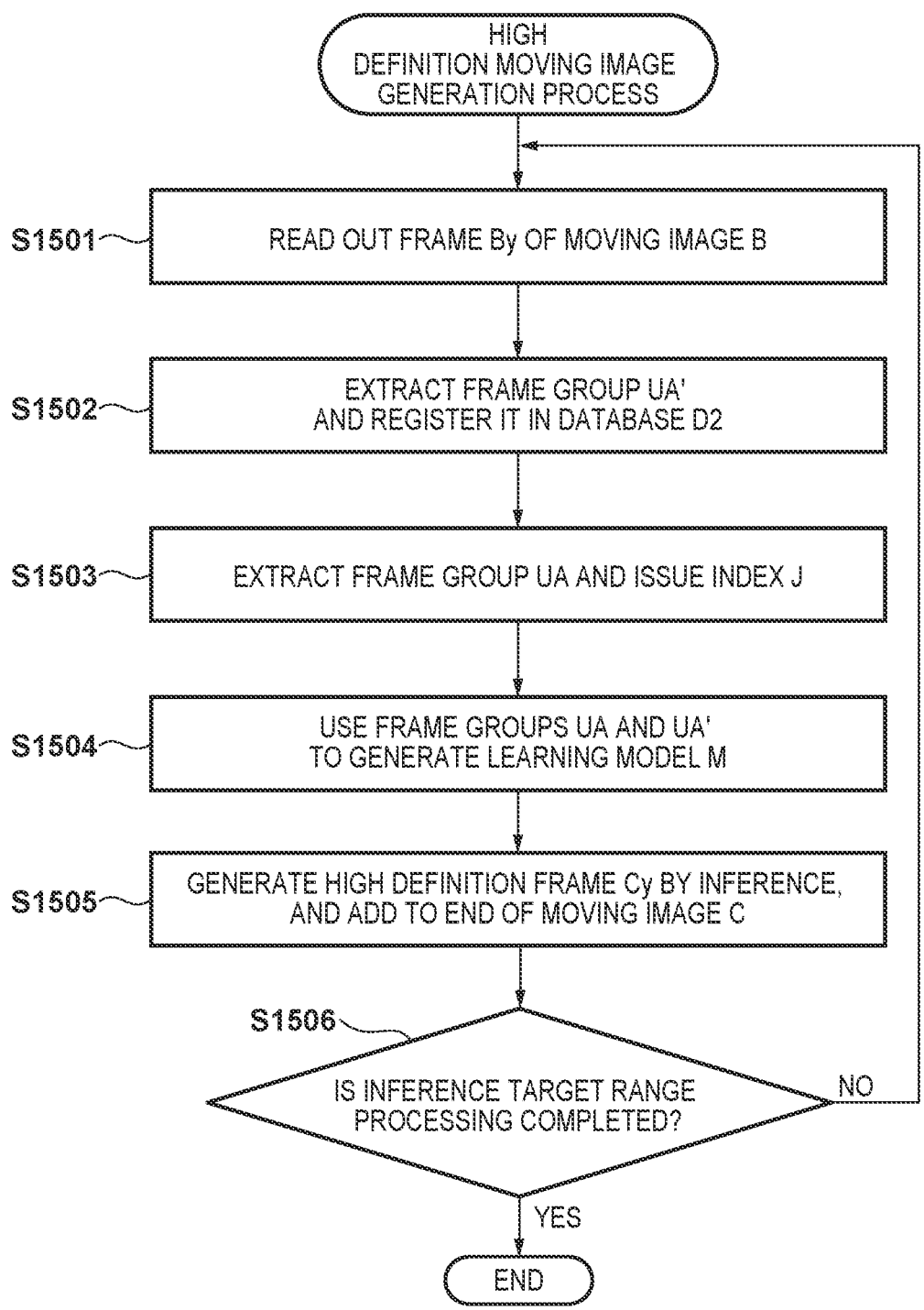
FIG. 15 is a flowchart of high definition moving image generation processing according to the fifth embodiment.

Hereinafter, mainly the parts that are different from the processing (FIG. 7) of the first embodiment will be described with reference to the flowchart of FIG. 15.

Figure 7:
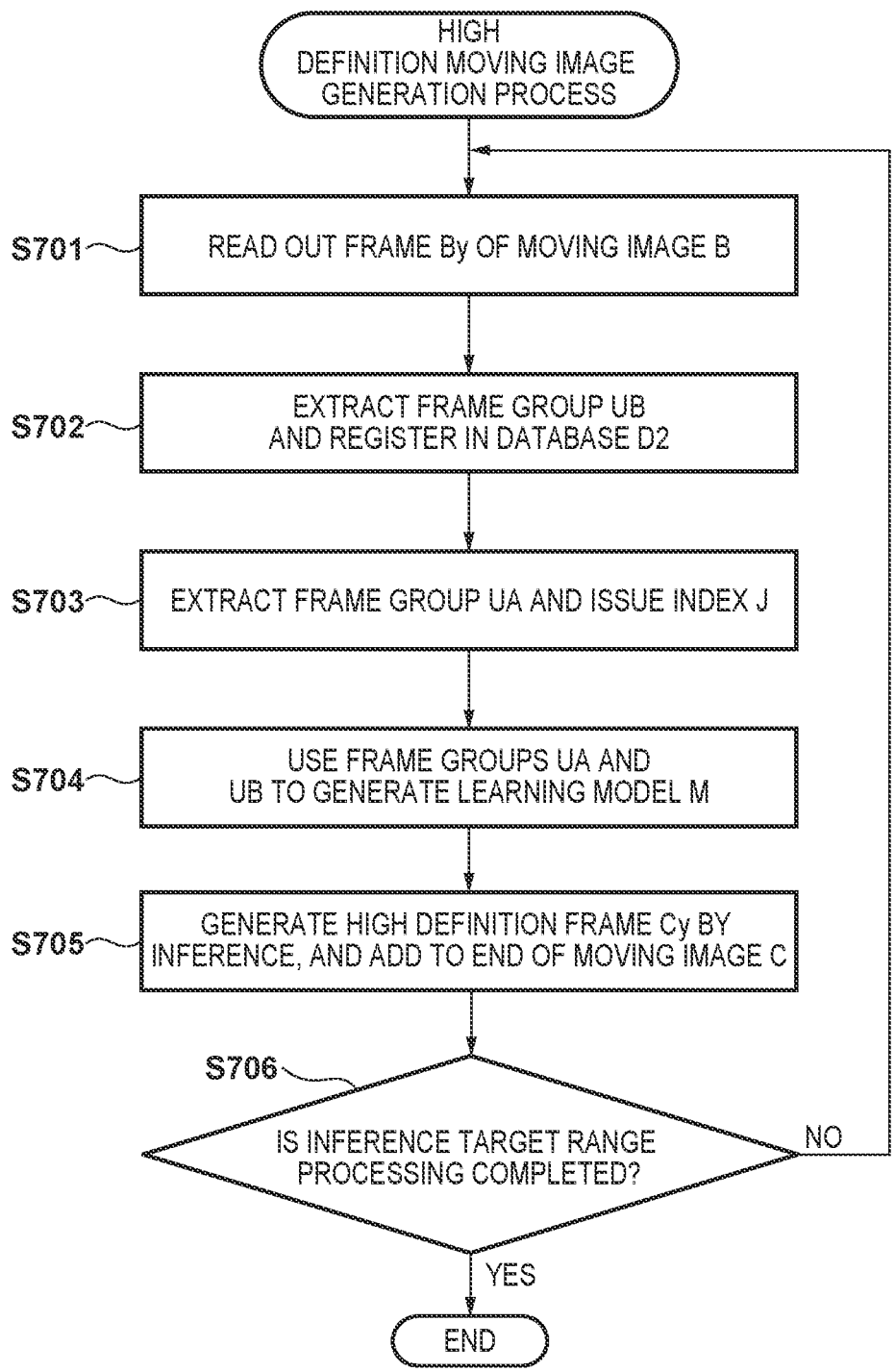
FIG. 7 is a flowchart of high definition moving image generation processing according to the first embodiment.

The processing of step S1501 is similar to the step S701 of the first embodiment (FIG. 7). In step S1502, the teacher data extraction unit 414, from the frame group TA' of the teacher data candidate registered in the candidate database D1, extracts a frame with a difference in imaging time with the frame By that is less than a threshold set in advance in the system. As the threshold, the display period of one frame of the moving image A (display period of one frame via the frame rate XA) can be used, for example. The teacher data extraction unit 414 registers the extracted frame in the teacher database D2.

Specifically, first, the teacher data extraction unit 414 references the table PA' and obtains the time information of the frame registered in the frame group TA'. Then, the teacher data extraction unit 414 registers a frame with a difference in time with the frame By, from among the time information of the obtained frame group TA', that is less than the threshold in the teacher database D2 on the RAM 103. Hereinafter, the frame group of the moving image A' registered in the teacher database D2 is referred to as frame group UA'. Note that in the present embodiment, a frame with a difference in the imaging time to the frame By that is less than the predetermined threshold is extracted from the candidate database D1. However, no such limitation is intended. For example, a frame with an indicator (for example, SSIM) indicating the degree of similarity between the image of the frame By and the image of each frame of the frame group TA' that is higher than a threshold set in advance in the system may be extracted from the frame group TA' and registered in the teacher database D2.

In step S1503, the teacher data extraction unit 414 registers, in the teacher database D2, the frames of the frame group TA associated via the index I with each frame of the frame group UA'. Specifically, the teacher data extraction unit 414 references the candidate database D1 on the RAM 103 and registers, in the teacher database D2, the frames of the frame group TA associated via the index I with each frame of the frame group UA'. At this time, the associated combinations (pair of frames) are not changed, and an index J that is unique in the teacher database D2 is assigned to each combination. Hereinafter, the frame group of the moving image A registered in the teacher database D2 is referred to as the frame group UA.

In step S1504, the learning unit 451 references the teacher database D2 and performs learning using the frame group UA and the frame group UA' and generates the learning model M. Specifically, first, the learning unit 451 references the teacher database D2 and the tables PA and PA', reads out the frame data from the storage unit 106, and inputs this into the learning model generation function. The learning unit 451 performs learning using the frame data read out by the learning model generation function and stores the learning model M generated as the learning result in the RAM 103. The details of the learning of the learning model are as described above with reference to FIG. 8. The subsequent processing of steps S1505 to S1506 is similar to that of the first embodiment (processing of steps S705 to S706 in FIG. 7).

As described above, according to the embodiments described above, the teacher data used in the learning of the learning model is selected on the basis of the high definition target image. Accordingly, the learning model trained using the selected teacher data can infer the high frequency components of the high definition target image with greater accuracy, allowing a highly accurate high definition image to be obtained. In other words, the accuracy of the moving image super-resolution imaging for making a moving image high definition can be improved.

Note that in the embodiments described above, in obtaining the teacher data candidate, the image forming the pair with the image selected from the moving image A is an image selected from the moving image B on the basis of imaging time or similarity with the image or an image obtained by lowering the resolution of the selected image. However, the present embodiment is not limited thereto. It is sufficient that an image related to the image selected from the moving image A to be used as the teacher data candidate is an image related to the selected image with a resolution that is lower than that of the selected image. Whether or not the image is related to the image selected from the moving image A may be determined on the basis of a common characteristic, such as air temperature at the time of image capture, imaging location, imaging direction, or the like, for example.

Also, in the embodiments described above, the processing has two stages in which the teacher database D2 is generated after the candidate database D1 is generated. However, no such limitation is intended. For example, the teacher data extraction unit 414 may extract a frame that may be a pair with the teacher data from the moving image A on the basis of the frame By and may use the extracted frame and a frame related to the extracted frame as a pair to obtain the teacher data. However, when a plurality of images of the moving image B are sequentially being made high definition, as in the embodiments described above, it is more efficient to generate the candidate database D1 and then extract and use appropriate teacher data from the candidate database D1 according to the high definition target image.

Also, in the embodiments described above, the targets of the processing as the moving image a and the moving image b with a lower resolution than the moving image a. However, no such limitation is intended. For example, an uncompressed moving image a and a moving image b obtained by being restored after being compressed may be the processing targets. In this case, the moving image a may be thinned out in terms of frames and stored. In this manner, the relationship between the moving image a and the moving image b which are the processing targets for the embodiments described above is not limited to a resolution size relationship, and it is sufficient that the moving image a has better definition that the moving image b. In other words, it is sufficient that the image group forming the moving image a (moving image A) includes higher frequency components than the image group forming the moving image b (moving image B). For example, the processing of the embodiments described above can be applied as long as each image of the image group of the moving image a corresponds to one or more images of the image group of the moving image b and the images of the image group of the moving image a have higher frequency components than the image corresponding to the image group of the moving image b.

Also, the moving image data has been described in simple terms above. However, in the case of an apparatus can generate a still image at a predetermined timing during the recording of a moving image, for example, the embodiments described above can be applied in the following cases. In other words, a still image can be used as the data corresponding to the moving image a, and a moving image can be used as the data corresponding to the moving image b. For example, let's assume that one of the embodiments described above is applied to an image capture apparatus that captures images at a 6K Raw data size at 60 fps with an image sensor. Also, let's assume that the still image, for example, is data stored in a format such as JPEG or HEIF after development processing and still image compression without change to the 6K size. Furthermore, let's assume that the moving image is data (moving image data of 2K size at 60 fps) stored in a format such as MP4 after development processing and moving image compression of the Raw data obtained by converting the 6K data obtained by the image sensor into 2K data size. Under these assumptions, by the user pressing down the release switch and continuously capturing still images during recording to 2K moving image data at 60 fps with the image capture apparatus, for example, 6K still images at 10 fps intervals are generated with respect to the frame rate (60 fps) of the moving image. By applying one of the embodiments described above to the still image and moving image generated in this manner, data with still image quality can be generated that corresponds to the moving image of a period where a plurality of still images are captured, for example. In other words, a system can be achieved that obtains a moving image with a 6K size, which is the size of a still image, that looks like the moving image was captured at a 60 fps frame rate. Also, in this case, a still image and a moving image are prepared using the image capture apparatus, and, in the image capture apparatus, learning and inference processing is executed to generate data of the quality of the still image corresponding to the moving image.

Sixth Embodiment

In the sixth embodiment, improvement in learning performance and inference performance taking into consideration image similarity in relation to the learning processing and the inference processing of the first embodiment will be described.

In the first embodiment, appropriate teacher data is extracted for the frame By selected in step S701 of FIG. 7, and the teacher data is used in step S704 to generate or update the learning model M. Also, in step S705, high frequency components are inferred using the learning model M, and the high definition frame Cy is generated. However, with this method, when various textures, such as that of people, buildings, vegetations, the ocean, and the like, are included in the frame By, the amount of information learnt in one time is great, meaning that the desired learning performance may not be obtained. This is because the high frequency components of various patterns are included in one frame. Accordingly, the learning processing of the sixth embodiment solves this problem by extracting a region from one frame, generating a learning model for each local region, performing inference using the learning model for each local region, and generating images converted into high definition for each local region and combining them.

In the sixth embodiment, the hardware configuration and functional configuration of the image processing apparatus 100 is similar to that of the first embodiment (FIG. 1). The extracted teacher data may be as according to any one of the first to fifth embodiments. The processing after the learning processing is different, and this will be described in detail using the flowchart in FIG. 16 and an example of the learning inference processing in FIG. 17.

The processing of steps S1601 to S1603 is similar to the steps S701 to S703 of the first embodiment (FIG. 7).

In step S1604, the inference unit 452 extracts (local region determination) a local region from the inference target frame By and holds this in the RAM 103. Hereinafter, the extracted local region (local image) is referred to as a local region Byn 1701.

Next, in step S1605, the learning unit 451 selects (local region selection) a local region UAn 1702 and UBn 1703 corresponding to the same coordinate position as the local region Byn of the inference target frame By from the teacher data (frame group UA and UB) registered in the teacher database D2. The learning unit 451 helds the selected local region UAn 1702 and local region UBn 1703 in the RAM 103. In the present embodiment, the teacher data is one pair of local regions, but the teacher data may be a plurality of pairs of local regions. Note that this local region group is rectangular region with a uniform size of dozens of pixels× dozens of pixels. However, no such limitation is intended.

Note that the expression "local region corresponding to the same coordinate position" as the local region Byn 1701, which is the inference target, refers to a region indicated by the exact same coordinates as the local region of the inference target frame By in the case of the frame group UB. In other words, if the local region coordinates of the inference target frame By are (sx, sy), the local region coordinates of the local region UBn 1703 are also (sx, sy). Also, in the frame group UA, the ratio between the resolution XA of the moving image A and the resolution XB of the moving image B is taken into account. For example, when XA:XB corresponds to a relationship of 2:1 in terms of width and height, if the local region coordinates of the inference target frame By are (sx, sy), the local region coordinates of the local region UAn 1702 are (sx*2, sy*2). Hereinafter, this will be referred to as the "local region corresponding to the same coordinate position".

In step S1606, the learning unit 451 uses the local region UAn 1702 and the local region UBn 1703 and generates a learning model Mn 1704 (local region learning model) using the learning model generation function illustrated in FIG. 8. The learning unit 451 reads out the frame data of the frame pair registered as the teacher data from the storage unit 106, inputs this into the learning model generation function for each local region, and stores the generated learning model Mn 1704 in the RAM 103.

In step S1607, the inference unit 452 uses the learning model Mn 1704 generated in step S1606 to perform inferencing for the local region Byn 1701 and generate a high definition frame local region Cyn 1705 (local high frequency component). First, the inference unit 452 reads out the learning model Mn 1704 stored in the RAM 103 in step S1606. Next, the inference unit 452 inputs the local region Byn 1701 held in the RAM 103 in step S1604 into the CNN of the learning model Mn 1704 and generates high frequency components expected when enlarging the local region Byn 1701 to the local region UAn 1702. The inference unit 452 generates the local region Cyn 1705 by adding the generated high frequency components to the image obtained by linearly enlarging the image of the local region Byn 1701 to the local region UAn 1702 and stores this in the RAM 103. Note that the processing from the high frequency component inference to the high definition image generation executed for the local region Byn 1701 is processing similar to that of the inference process illustrated in FIG. 8.

Next, in step S1608, the inference unit 452 combines the local regions Cyn 1705 stored in the RAM 103 on the basis of the frame coordinate position information to generate a high definition frame Cy 1706, and holds this in the RAM 103. Note that 1705 indicated by a dashed line in FIG. 17 denotes the local region Cyn, and 1706 indicated by a solid line denotes the high definition frame Cy.

In step S1609, the control unit 101 determines whether or not the processing described above has been completed on all of the local regions of the frame By. When the control unit 101 determines that the processing is not complete (NO in step S1609), the processing proceeds to step S1605, and the processing described above is repeated on the next local region of the frame By. When the control unit 101 determines that the processing is complete (YES in step S1609), the processing proceeds to step S1610.

In step S1610, the inference unit 452 adds the frame data of the high definition frame Cy 1706 stored in the RAM 103 to the end of the high definition moving image C on the storage unit 106. Also, the imaging time information of the frame By is replicated and multiplexed as the imaging time of the high definition frame Cy 1706 and stored in the moving image C.

In step S1611, the control unit 101 determines whether or not the processing described above has been completed on all of the frames of the moving image B. When the control unit 101 determines that the processing is not complete (NO in step S1611), the processing proceeds to step S1601, and the processing described above is repeated with the next frame of the moving image B being taken as the frame By. When the control unit 101 determines that the processing is complete (YES in step S1611), the present processing ends. As described above, when the high definition moving image generation processing ends, the high definition moving image C with the resolution XA and the frame rate FB is stored in an uncompressed format in the storage unit 106.

As described above, according to the sixth embodiment, with a high definition target image with various textures and a large amount of information, by performing learning for each local region, the amount of information used in one pass of learning can be narrowed down, enabling learning with higher accuracy. Accordingly, an image of higher definition can be generated.

Seventh Embodiment

The seventh embodiment described below is an example in which the super-resolution is improved by changing the learning processing for each local region according to the sixth embodiment.

With the method of the sixth embodiment, a learning model is generated by performing learning of a region in the same position as the inference target region from in a frame that is different from the inference target. However, with this method, when the subject moves a lot, for example, what is shown in the inference region and the teacher data may be different. This may make it difficult to obtain the desired super-resolution performance.

To solve this problem, in the learning processing of the seventh embodiment, a degree of similarity evaluation function is provided. Via this, a region with a high degree of similarity to the inference region is searched for in the teacher data candidates and the obtained region with a high degree of similarity is used in learning.

High Definition Moving Image Generation Processing

Figure 16:
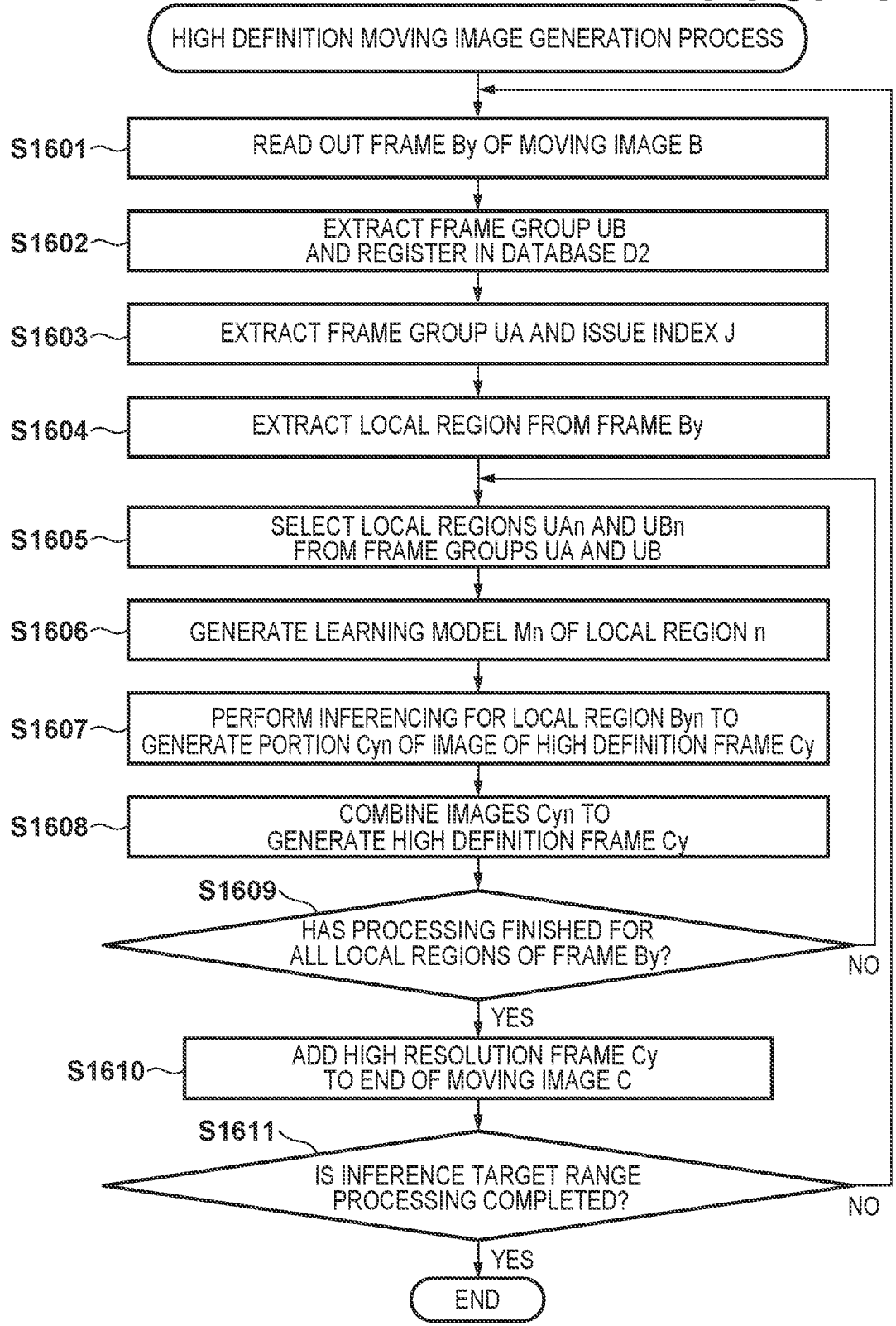
FIG. 16 is a flowchart of high definition moving image generation processing according to a sixth embodiment, a seventh embodiment, an eighth embodiment, and a ninth embodiment.
Figure 17:
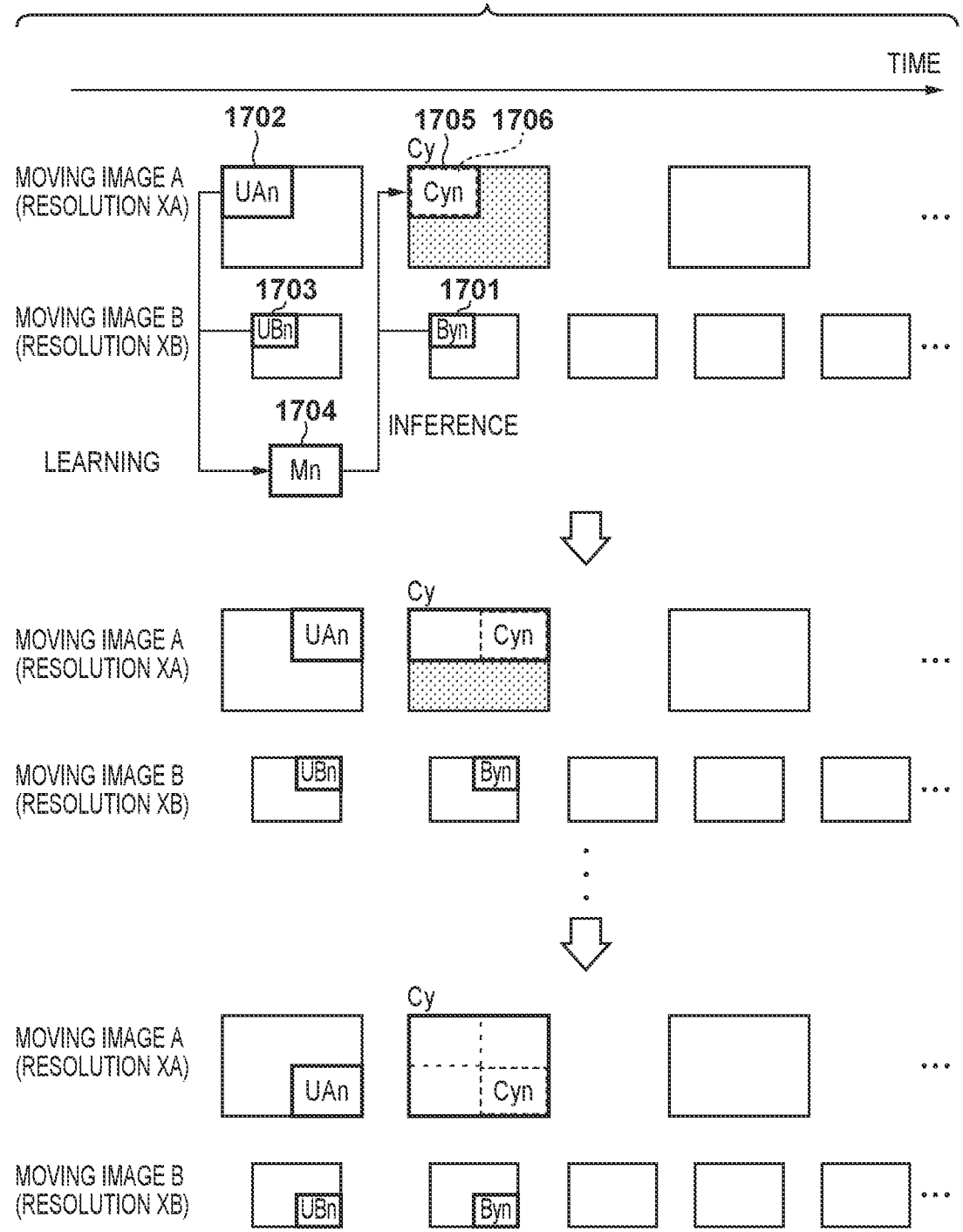
FIG. 17 is a diagram illustrating an example of learning/inference processing according to the sixth embodiment.

The difference between the seventh embodiment and the sixth embodiment is only in the processing of step S1605 in the flowchart of the high definition moving image generation processing illustrated in FIG. 16. Thus, only the processing of step S1605 according to the seventh embodiment will be described.

In step S1605, the inference unit 452 extracts a region of the inference target frame By and holds this in the RAM 103 as a local region. Note that this local region is rectangular region with a uniform size of dozens of pixels×dozens of pixels. However, no such limitation is intended. The control unit 101 uses SSIM provided in order to implement the degree of similarity evaluation function, searches for the region UBn with the highest degree of similarity with the local region of the inference target frame By in the frame group UB of the teacher data registered in the teacher database D2, and holds this in the RAM 103. The learning unit 451 selects, from the frame group UA, a frame to form a pair with the frame the local region UBn held in the RAM 103 belongs and, from this, holds the local region UAn with relatively the same position as the local region UBn in the RAM 103. Note that Peak Signal to Noise Ratio (PSNR), Signal to Noise Ratio (SNR), or Mean Square Error (MSE) may be used for degree of similarity evaluation. Also, as described above, the region UBn with the highest degree of similarity is searched for in all of the frames included in the frame group UB. However, no such limitation is intended. For example, the region UBn with the highest degree of similarity may be searched for in each frame included in the frame group UB. In this case, the number of pairs of the local region UBn and the local region UAn obtained is equal to the number of frames included in the frame group UB.

As described above, according to the seventh embodiment, learning is performed using a region with a high degree of similarity with the inference region. Thus, even with a moving image in which the subject moves a lot, a higher definition image can be generated.

Eighth Embodiment

In the eighth embodiment, a resolution method for the problem according to the sixth embodiment described in the seventh embodiment is described which is different from that of the seventh embodiment.

In the eighth embodiment, a method using motion vectors relating to the inference region is used to identify a region with a high degree of similarity.

However, according to the eighth embodiment, it is assumed that the moving image b is compressed using inter-frame prediction into the MPEG-4 AVC format. Note that MPEG-4 AVC is an abbreviation for ISO/IEC. 14496-10 "MPEG-4 Part 10: Advanced Video Coding".

Next, mainly the differences between the eighth embodiment and the sixth embodiment will be described.

Data stored in Storage Medium and Decoding and Loading Method therefor In the processing of the analysis unit 211 according to the eighth embodiment, in addition to the processing to parse the moving image data stored in the storage unit 106 (as described in the first embodiment), the following processing is also executed. The analysis unit 211 parses the MP4 file storing the moving image b and obtains avcC box. Then, the analysis unit 211 obtains a Sequence parameter set (hereinafter, referred to as SPS) and a Picture parameter set (hereinafter, referred to as PPS) included in the avcC box and stores this in the RAM 103.

High Definition Moving Image Generation Processing

Figure 18:
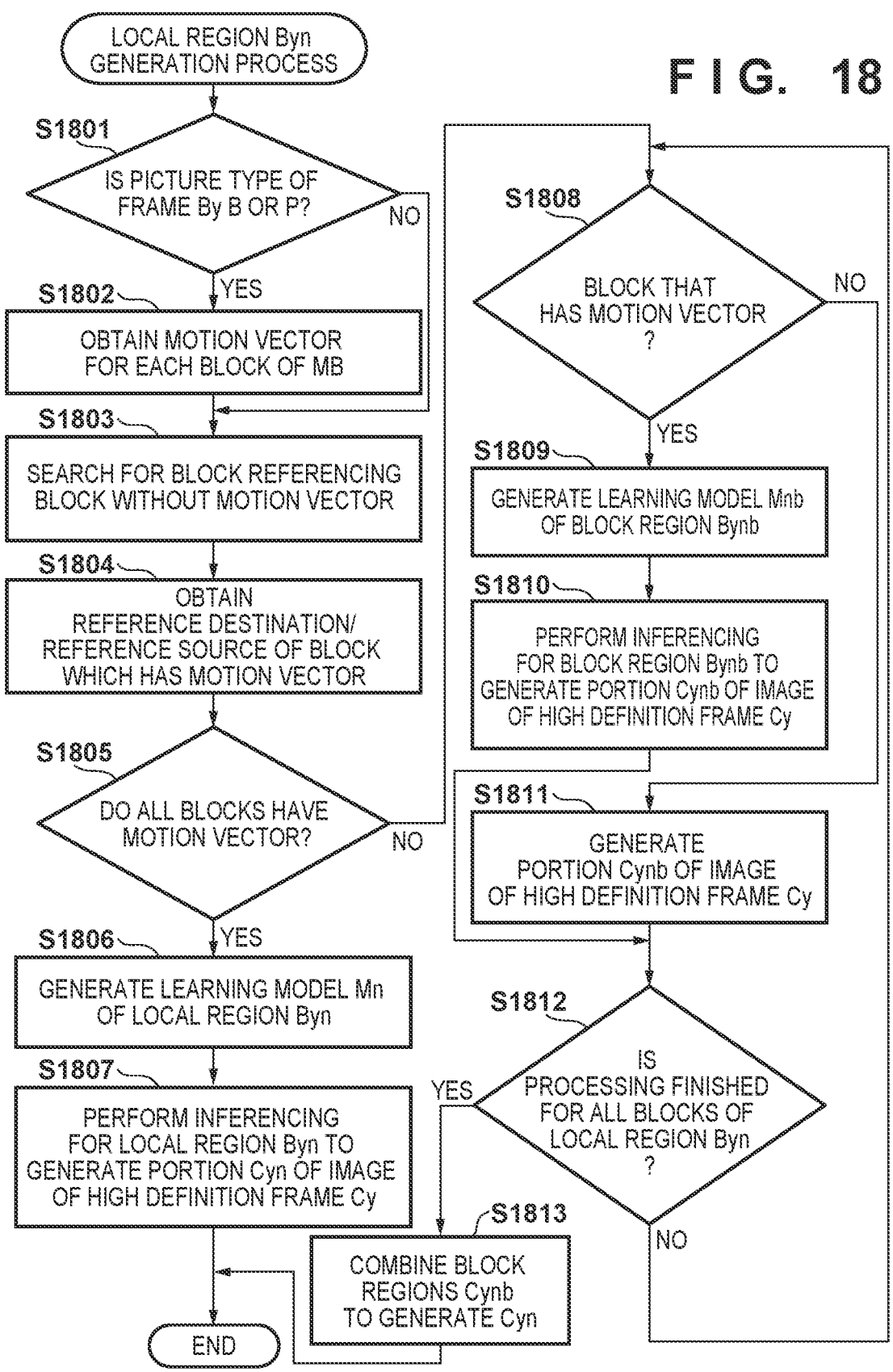
FIG. 18 is a flowchart of high definition moving image generation processing according to the eighth embodiment.

The difference in the high definition moving image generation processing between the eighth embodiment and the sixth embodiment is in the processing of the steps S1605 to S1607 in the flowchart of FIG. 16. Thus, the processing of steps S1605 to S1607 according to the eighth embodiment will be described using the flowchart of FIG. 18.

Note that in step S1604 according to the sixth embodiment described above, the inference unit 452 extracts the local region Byn of the inference target frame By as a rectangular region with a uniform size of 16×16 pixels.

In step S1801, when the inference target frame By is an I picture, the control unit 101 advances the processing to step S1803. When the inference target frame By is a P picture or a B picture, the control unit 101 advances the processing to step S1802. Whether the inference target frame is an I picture, a P picture, or a B picture can be determined by referencing the SPS and the PPS, for example.

In step S1802, the control unit 101 obtains a Macroblock layer from the local region Byn of the inference target frame By. Also, when using a Sub-macroblock, a Sub-macroblock prediction is obtained. Otherwise, a Macroblock prediction is obtained.

The control unit 101 derives a predicted unit block region Bynb for the macroblock via the Sub-macroblock prediction or the Macroblock prediction of the macroblock to which the local region Byn of the inference target frame By belongs. The predicted unit block region Bynb may be a macroblock, each block of the macroblock divided by partitioning, each block of a sub-macroblock, or each block of a sub-macroblock divided by partitioning. These blocks are units of motion compensation in MPEG-4 AVC.

The control unit 101 derives a motion vector of the block region Bynb, a referenced frame, mbPartIdx, and subMbPardIdx via SPS, PPS, Macroblock prediction, or Sub-macroblock prediction.

Here, the control unit 101 generates six pieces of information, "mbPartIdx", "subMbPartIdx", "presence of motion vector", "motion vector", "reference/referenced frame", and "reference direction" for each block region Bynb and stores this in the RAM 103. "mbPartIdx" and "subMbPartIdx" are information for identifying which block region in the macroblock is the block region Bynb. "Motion vector" refers to the temporal and spatial movement of the block region Bynb and specifically refers to the reference destination block for the referenced frame. "Presence of motion vector" refers to whether or not the block region Bynb includes such a motion vector. "Reference/referenced frame" refers to a referenced frame referenced when decoding the inference target frame By from which the block region Bynb is extracted and a reference frame that references the block region Bynb. When generating the "reference/referenced frame" in step S1802, the referenced frame is stored. Also, for the term "reference direction", the direction indicated by the motion vector from the macroblock of the local region Byn of the inference target frame By is the reference direction, and the direction indicated by the local region Byn of the inference target frame By from the macroblock of other frames is the referenced direction. Hereinafter, the six pieces of information described above are collectively referred to as motion vector information.

The control unit 101 checks whether a frame identifiable via the "reference/referenced frame" of the generated motion vector information exists in the teacher data candidate. When a frame identifiable by the "reference/referenced frame" exists in the teacher data candidate, the control unit 101 sets the "presence of motion vector" from the motion vector information to YES, and when it does not exist, the control unit 101 sets the "presence of motion vector" to NO.

Also, for example, when the inference target frame By is a B picture and the block includes two motion vectors, a referenced frame that is closer in terms of temporal distance to the inference target frame By is used. When the difference in temporal distance to the inference target frame By is the same, information of the motion vector that is closer in terms of spatial distance indicated by the motion vectors and the referenced frame is used. When the temporal distance and the spatial distance are both equal, either of the referenced frames may be used.

In step S1803, for the block region Bynb which has NO for "presence of motion vector" in the motion vector information, the control unit 101 searches for a block that references the block region Bynb in the teacher data candidate. Hereinafter, a block that references the block region Bynb is also referred to as a reference source block. Note that the method for obtaining the motion vector and the reference frame information required for determining whether or not the block is a reference source block of the block region Bynb has been described with reference to step S1802 and is thus omitted.

When a block that references the block region Bynb (reference source block of the block region Bynb) is found, the "presence of motion vector" in the motion vector information of the block region Bynb is updated to YES. Also, the frame including the block the references the block region Bynb is stored as the referenced frame in the "reference/ referenced frame". Note that the range of the frame searched for is within 3 frames to the front or back of the frame including the block region Bynb. Also, the range of the macroblock searched for is within MaxVmvR of each level set per MPEG-4 AVC. MaxVmvR is derived from the SPS of the moving image b. Note that the range of the frame searched for and the range of the macroblock searched for are not limited to these examples.

In step S1804, for each of the block region Bynb with YES for "presence of motion vector" in the motion vector information, the inference unit 452 obtains a reference destination or the reference source block region UBXnb from the frame group UB and holds these in the RAM 103. Also, the inference unit 452 obtains, from the frame group UA, a block region UAXnb corresponding to the same coordinate position as the block region UBXnb obtained via the motion vector information of each block region Bynb stored in the RAM 103 and holds these in the RAM 103. In other words, the inference unit 452 obtains the block region UAXnb corresponding to the same coordinate position as the block region UBXnb from the frame of the frame group UA that forms a pair with the frame which the block region UBXnb belongs to. Also, the inference unit 452 associates the block region UAXnb with the block region UBXnb and holds this in the RAM 103.

In step S1805, the control unit 101 determines whether the "presence of motion vector" of the motion vector information for all of the block regions Bynb included in the local region Byn of the inference target frame By is YES or NO. When the control unit 101 determines YES for the "presence of motion vector" for all of the block regions Bynb (YES in step S1805), the processing proceeds to step S1806.

In step S1806, the inference unit 452 combines the block regions UBXnb stored in the RAM 103 on the basis of the coordinate position information of the block regions Bynb and generates a local region UBXn. The inference unit 452 holds the generated local region UBXn in the RAM 103.

Also, the inference unit 452 combines the block regions UAXnb corresponding to the same coordinate position as the block region UBXnb stored in the RAM 103 on the basis of the coordinate position information of the block regions Bynb and generates a local region UAXn. The inference unit 452 holds the generated local region UAXn in the RAM 103.

Also, the learning unit 451 generates a learning model Mn using the local region UAXn and the local region UBXn stored in the RAM 103 and the learning model generation function illustrated in FIG. 8. Note that the local region UBXn is teacher data corresponding to the same coordinate position as the local region UAXn of the pair-forming frame. The learning unit 451 reads out the teacher data from the RAM 103, executes the learning model generation function, and stores the generated learning model Mn in the RAM 103.

In step S1807, the inference unit 452 uses the learning model Mn generated in step S1806 to perform inferencing for the local region Byn of the frame By and generate the local region Cyn of a high definition frame.

First, the inference unit 452 reads out the learning model Mn stored in the RAM 103 in step S1806. Next, the inference unit 452 inputs the local region Byn of the frame By held in the RAM 103 into the CNN of the learning model Mn and generates high frequency components expected in the local region Byn when enlarging the inference target frame By to the resolution XA. The inference unit 452 generates the local region Cyn by adding the generated high frequency components to the local region Byn obtained by linearly enlarging on the basis of the ratio between the resolution XB and the resolution XA and this is stored in the RAM 103. Note that the processing from the high frequency component inference to the high definition image generation executed for the local region Byn is processing similar to that of the inference process illustrated in FIG. 8.

In step S1805, when the control unit 101 determines that the local region Byn includes a block region Bynb with NO for "presence of motion vector" (NO in step S1805), the processing proceeds to step S1808. In step S1808, the control unit 101 determines whether the "presence of motion vector" of the motion vector information for each block region Bynb included in the local region Byn is YES or NO. When the control unit 101 determines YES for the "presence of motion vector" (YES in step S1808), the processing proceeds to step S1809. On the other hand, in step S1808, when the control unit 101 determines NO for the "presence of motion vector" (YES in step S1808), the processing proceeds to step S1811.

In step S1809, the learning unit 451 uses the block region Bynb and the local region UBXnb, generates a learning model Mnb using the learning model generation function illustrated in FIG. 8, and holds this in the RAM 103.

More specifically, in step S1809, the learning unit 451 generates the learning model Mnb for inference of the block region Bynb using the local region UBXnb and the local region UAXnb stored in the RAM 103 and the learning model generation function illustrated in FIG. 8. Note that the local region UBXnb is teacher data corresponding to the same coordinate position as the local region UAXnb of the pair-forming frame. The learning unit 451 reads out the teacher data from the RAM 103, inputs this into the learning model generation function, and stores the generated learning model Mnb in the RAM 103.

In step S1810, the inference unit 452 uses the learning model Mnb to perform inferencing for the block region Bynb of the frame By and generate a block region Cynb of a high definition frame. First, the inference unit 452 reads out the learning model Mnb stored in the RAM 103 in step S1809. Next, the inference unit 452 inputs the block region Bynb held in the RAM 103 into the CNN of the learning model Mnb and generates high frequency components expected in the local region Bynb when enlarging the inference target frame By to the resolution XA. The inference unit 452 generates the block region Cynb of a high definition frame by adding the generated high frequency components to the local region Bynb obtained by linearly enlarging on the basis of the ratio between the resolution XB and the resolution XA and this is stored in the RAM 103. Note that the processing from the high frequency component inference to the high definition image generation executed for the block region Bynb is processing similar to that of the inference process illustrated in FIG. 8.

In step S1811, the control unit 101 holds, in the RAM 103, the block region Cynb of the high definition frame Cy obtained by linearly enlarging the block region Bynb with NO for the presence of motion vector in the motion vector information on the basis of the ratio between the resolution XA and the resolution XB. Note that the method of linearly enlarging is not limited as long as the enlargement can be performed on the basis of the ratio between the resolution XA and the resolution XB.

In step S1812, the control unit 101 determines whether the processing described above has been completed on all of the block regions Bynb. When the control unit 101 determines that the processing is not complete (NO in step S1812), the processing proceeds to step S1807, and the processing is performed on an uncompleted block region Bynb. When the control unit 101 determines that the processing is complete (YES in step S1812), the processing proceeds to step S1813. In step S1813, the control unit 101 reads out the block regions Cynb held in the RAM 103 in step S1810 and step S1811, combines these on the basis of the coordinate position information of the corresponding block regions Bynb, and generates the local region Cyn of a high definition frame. The generated local region Cyn is held in the RAM 103. In step S1608 of FIG. 16, the local region Cyn generated as described above is used as the local region Cyn 1705.

As described above, according to the eighth embodiment, learning is performed using a motion vector with a region with a high degree of similarity with the inference region that references/is referenced. Thus, even with a moving image in which the subject moves a lot, a higher definition image can be generated.

Ninth Embodiment

In the ninth embodiment, a resolution method for the problem according to the sixth embodiment described in the seventh embodiment is described which is different from that of the seventh and eighth embodiment.

Next, mainly the differences between the ninth embodiment and the sixth embodiment will be described.
High Definition Moving Image Generation Processing The difference between the ninth embodiment and the sixth embodiment is only in the processing of steps S1605 and S1606 in the flowchart of the high definition moving image generation processing illustrated in FIG. 16. Thus, the processing of steps S1605 and S1606 according to the ninth embodiment will be described below.

Figure 19:
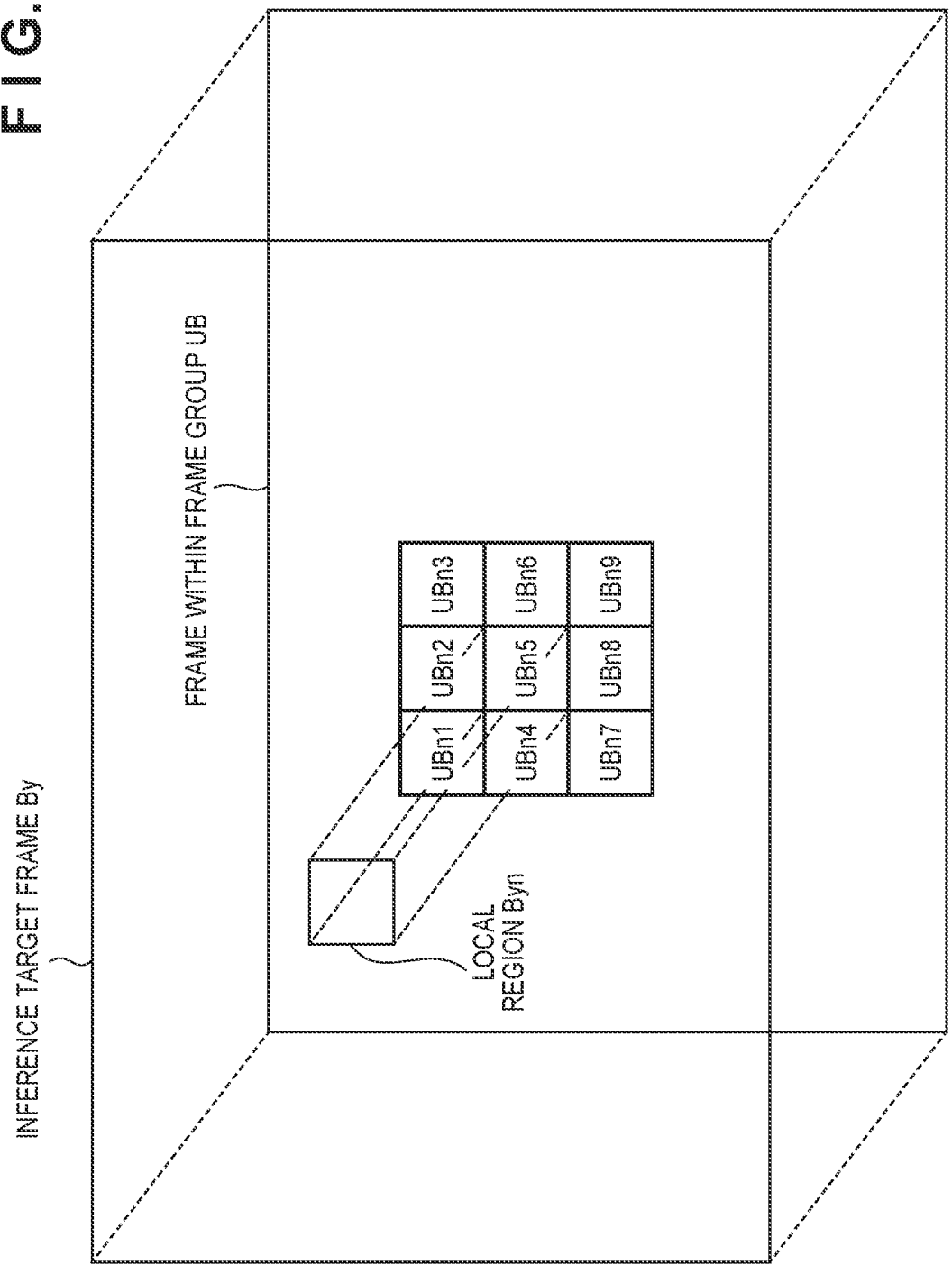
FIG. 19 is a diagram illustrating an example of teacher data region selection according to the ninth embodiment.

In step S1605, the control unit 101 selects local regions (corresponding to UAn5 and UBn5) corresponding to the same coordinate position as the local region Byn of the inference target frame By from the pair-forming frames of the frame groups UA and UB and holds this in the RAM 103. In addition, the control unit 101 holds eight regions that are adjacent to UBn5 and have the same size as the UBn5 in the RAM 103. In a similar manner, the control unit 101 stores eight regions that are adjacent to UAn5 and have the same size as the UAn5 in the RAM 103. An example of the region selection of the frames included in the frame group UB is illustrated in FIG. 19. Note that in the present embodiment, for the inference target region, the region with the same positional coordinates as the local region Byn and the eight adjacent regions are selected. However, the selection method and the number of the regions is not limited thereto.

Next, the control unit 101 evaluates the degree of similarity between the local region Byn of the inference target frame By and UBn1 to UBn9 and obtains the degree of similarity evaluation values. Then, the control unit 101 determines the number of times for learning for each of UBn1 to UBn9 on the basis of the degree of similarity evaluation values and holds this as learning information in the RAM 103. Note that the learning information includes, for example, "information for identifying UBn1 to UBn9", "degree of similarity evaluation value with the local region Byn", and "number of times for learning". When the evaluation value for the degree of similarity with the local region Byn in the learning information is less than a threshold set in advance in the system, the control unit 101 updates the number of times for learning in the learning information to 0. For the regions with a degree of similarity evaluation value equal to or greater than the threshold, the number of times for learning is determined using the ratio of degree of similarity evaluation values between the regions with a degree of similarity evaluation value equal to or greater than the threshold and the learning information is updated. In this example, the degree of similarity evaluation values of UBn4, UBn5, and UBn6 are equal to or greater than the threshold and the ratio between them is 2:5:3. Also, the total number of times for learning is set to 1000 times. In this example, the number of times for learning for the learning information of UBn4 to UBn6 is 200 times, 500 times, and 300 times, respectively. Note that in this method for determining the number of times for learning according to the present embodiment, the number of times for learning is linearly allocated to the regions with a degree of similarity evaluation value greater than the threshold. However, the method is not limited thereto.

In step S1606, the learning unit 451 uses the pair of an image of the local region (one of UBn1 to UBn9) indicated by the learning information and an image of the local region (one of UAn1 to UAn9) in the corresponding frame group UA as teacher data in generating the learning model Mn. The learning unit 451 performs learning using the learning model generation function illustrated in FIG. 8 the number of times for learning indicated by the learning information for each piece of teacher data and generates the learning model Mn. The generated learning model Mn is stored in the RAM 103.

The processing from step S1607 is the same as that in the sixth embodiment, and thus the description thereof is omitted.

As described above, according to the ninth embodiment, a plurality of regions with a high degree of similarity to the inference region are used in the learning in accordance with the degree of similarity with the inference region. Thus, even with a moving image in which the subject moves a lot, a higher definition image can be generated.

As described above, according to the sixth to ninth embodiments, the local regions can be determined from a high definition target image and the amount of information used in the learning of the learning model can be narrowed down. Furthermore, according to the sixth to ninth embodiments, the local regions of the teacher data with high correlation with the local region determined from the high definition target image can be selected and used in the learning of a learning model. Accordingly, the high frequency components of the high definition target image can be inferred with greater accuracy, allowing a highly accurate high definition image to be obtained. In other words, the accuracy of the moving image super-resolution imaging for making a moving image high definition can be improved.

Tenth Embodiment

The tenth embodiment described below is an example in which the learning processing for the learning model according to the first embodiment is changed and the learning processing load is decreased. In the method of the first embodiment, a learning model is generated for each inference target frame, and the super-resolution performance is improved via inference processing. However, with this method, a number of learning models equal to the number of inference target frames must be generated. This tends to increase the learning processing load. However, with the learning processing of the tenth embodiment, the amount of movement is detected from the previous frame for each inference target frame, and the learning model M uses the first previous inference target frame for the inference target frame with little movement. In this manner, the number of times a learning model is generated is reduced, and the learning processing load is reduced.

The difference between the tenth embodiment and the first embodiment is in the processing of the flowchart of the high definition moving image generation processing illustrated in FIG. 7. Accordingly, mainly the differences in the processing with the first embodiment will be described below.

Figure 20:
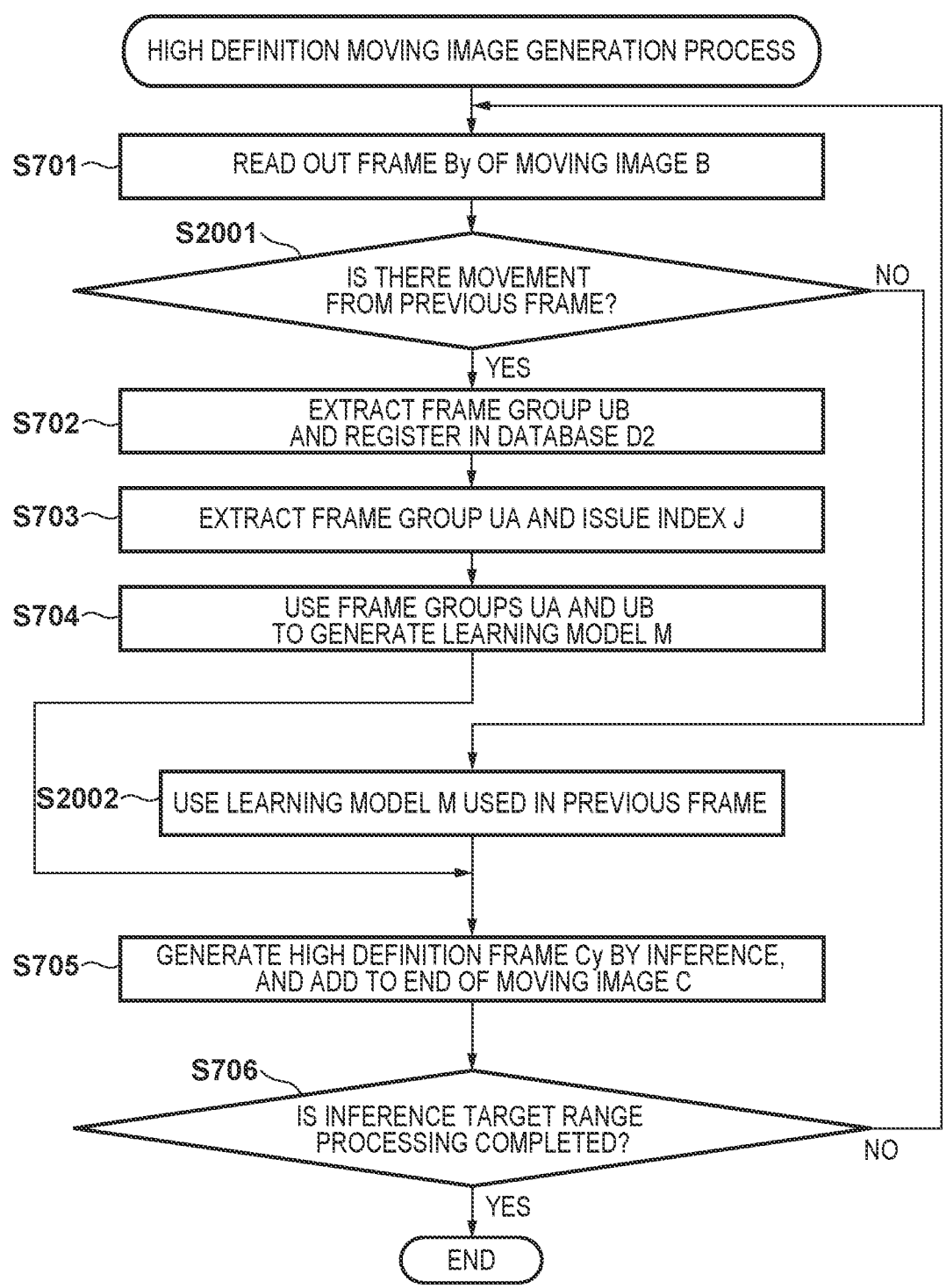
FIG. 20 is a flowchart of high definition moving image generation processing according to a tenth embodiment.

FIG. 20 is a flowchart illustrating the high definition moving image generation processing according to the tenth embodiment. Steps in which processing similar to that of the first embodiment is executed are given the same reference number as in the first embodiment (FIG. 7). In step S2001, the control unit 101 determines, for the inference target frame By read out in step S701, whether or not there is movement from the first previous inference target frame. The control unit 101 calculates the difference between the inference target frame By and the first previous inference target frame and determines that "there is movement" when the difference is greater than a threshold and determines that "there is no movement" when the difference is equal to or less than the threshold. The difference between the two frames may be the degree of similarity between the inference target frame By and the first previous inference target frame obtained using SSIM, for example. When the obtained degree of similarity is higher than a specific threshold, "there is no movement" is determined. Note that Peak Signal to Noise Ratio (PSNR), Signal to Noise Ratio (SNR), Mean Square Error (MSE), or the like may be used for degree of similarity evaluation. When the control unit 101 determines that "there is movement" (YES in step S2001), the processing proceeds to step S702, and the learning model M is generated via processing (steps S702 to S704) similar to that of the first embodiment. On the other hand, in step S2001, when the control unit 101 determines that "there is no movement" (NO in step S2001), the processing proceeds to step S2002. In step S2002, the control unit 101 determines to use the learning model M used for the first previous inference target frame in the inference processing for the current inference target frame By executed in step S705. In step S705, the inference unit 452 infers the high frequency component using the learning model M generated in step S704 or the learning model M determined to use in step S2002. Also, the inference unit 452 generates the frame Cy obtained by making the inference target frame By high definition using the inferred high frequency components.

As described above, according to the tenth embodiment, since the learning model M used for a first previous inference target frame is used for the inference target frame in which "there is no movement", the number of times processing to generate a learning model is executed can be reduced. Thus, according to the present embodiment, the learning processing load can be reduced while maintaining the super-resolution performance.

Note that the tenth embodiment described above is an example that can be applied to the configuration of the first embodiment. However, it is obvious that this may also be applied in a similar manner to the configurations of the second to fifth embodiments. Also, the method of the tenth embodiment may be applied to the configuration of the sixth to ninth embodiments. In this case, when it is determined that there is movement between the inference target frame By and the first previous inference target frame, it is sufficient that a learning model is generated for each local region. On the other hand, when it is determined that there is no movement between the inference target frame By and the first previous inference target frame, the learning model used for the first previous inference target frame is used as the learning model for all of the local regions. In other words, the configuration for determining whether or not to use the learning model per frame unit according to the tenth embodiment can obviously also be applied to the configurations of the sixth to ninth embodiments. Furthermore, in the tenth embodiment, degree of similarity evaluation is performed on the inference target frame, but no such limitation is intended. For example, the sixth to ninth embodiments may have a configuration in which the degree of similarity between the local region of the inference target frame By and the local region of the first previous inference target frame is calculated and whether or not to use the learning model for each local region is determined. Since whether or not to generate (update) the learning model can be determined for each local region, precise updates to the learning model can be implemented while reducing the learning processing load.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-014438, filed Feb. 1, 2022, which is hereby incorporated by reference herein in its entirety.

What is claimed is:

1. An image processing apparatus that uses a first image group to make an image of a second image group with fewer high frequency components than an image of the first image group high definition, comprising:
   at least one processor; and
   at least one memory having instructions stored thereon which, when executed by the at least one processor, cause the image processing apparatus at least to:
      calculate a degree of similarity between a current image selected as a high definition target from the second image group and a previous image selected from the second image group which is a high definition target previous to the current image;
      a select, on a basis of the current image, teacher data to be used in learning from among a plurality of teacher data which use an image included in the first image group as one of a pair of images;
      generate a learning model for making the current image high definition using the teacher data;
      a infer high frequency components of the current image using the learning model when the degree of similarity is equal to or less than a threshold and infer high frequency components of the current image using a learning model used to make the previous image high definition when the degree of similarity is greater than the threshold; and
      generate a high definition image on a basis of the current image and the inferred high frequency components.

2. The image processing apparatus according to claim 1, wherein the instructions, when executed by the at least one processor, further cause the image processing apparatus at least to:
   obtain, as a candidate for the teacher data, a pair including a first image selected from the first image group and a third image related to the first image with fewer high frequency components than the first image,
   wherein the teacher data to be used in the learning is selected from the candidate for the teacher data.

3. The image processing apparatus according to claim 2, wherein the candidate for the teacher data is obtained by obtaining the third image from the second image group.

4. The image processing apparatus according to claim 3, wherein an image with imaging time identical to imaging time of the first image is obtained from the second image group, as the third image.

5. The image processing apparatus according to claim 3, wherein an image with a difference in imaging time to the first image that is less than a predetermined threshold is obtained from the second image group, as the third image.

6. The image processing apparatus according to claim 3, wherein an image with the highest similarity to the first image is obtained from the second image group, as the third image.

7. The image processing apparatus according to claim 6, wherein a similarity between an image of the first image reduced to a resolution of the second image group and an image of the second image group is determined.

8. The image processing apparatus according to claim 2, wherein an image of the first image reduced in size and with lower resolution is obtained, as the third image.

9. The image processing apparatus according to claim 8, wherein the third image is an image of the first image reduced to a resolution of the second image group.

10. The image processing apparatus according to claim 2, wherein a candidate for teacher data including an image with a difference in imaging time to the current image that is less than a predetermined threshold is selected, as the teacher data to be used in the learning.

11. The image processing apparatus according to claim 2, wherein teacher data including an image with a similarity to the current image that is greater than a predetermined threshold is selected, from among the candidate for the teacher data, as the teacher data to be used in the learning.

12. The image processing apparatus according to claim 1, wherein updating a parameter via backpropagation in the learning is controlled, on a basis of the teacher data to be used in the learning and the current image.

13. The image processing apparatus according to claim 12, wherein a coefficient on a basis of the teacher data to be used in the learning and the current image is determined and an update amount for the parameter via the backpropagation is controlled on a basis of the coefficient.

14. The image processing apparatus according to claim 13, wherein the coefficient is determined on a basis of a difference between imaging time of an image of teacher data to be used in the learning and imaging time of the current image.

15. The image processing apparatus according to claim 13, wherein the coefficient is determined on a basis of a similarity between an image of teacher data to be used in the learning and the current image.

16. The image processing apparatus according to claim 12, wherein a coefficient is determined on a basis of the teacher data to be used in the learning and the current image, and a number of repetitions of updating the parameter via the backpropagation is controlled on a basis of the coefficient.

17. The image processing apparatus according to claim 1, wherein the instructions, when executed by the at least one processor, further cause the image processing apparatus at least to:
   obtain, from the teacher data, a pair of images corresponding to a local region extracted from the current image,
   wherein a learning model is generated of the local region using the pair of images,
   wherein high frequency components of the local region of the current image are inferred using a learning model generated when the degree of similarity is equal to or less than the threshold and using a learning model used to make a region corresponding to the local region of the previous image high definition when the degree of similarity is greater than the threshold, and
   wherein a high definition image of the local region is generated using the high frequency components of the local region and an image of the local region of the current image, and high definition images generated for each local region are combined.

18. The image processing apparatus according to claim 17, wherein a degree of similarity between the current image and the previous image is calculated for each local region, and wherein a learning model is used for a local region where the degree of similarity is equal to or less than the threshold, a learning model is used to make the region of the previous image high definition for a local region where the degree of similarity is greater than the threshold, and high frequency components of the local region of the current image are inferred.

19. The image processing apparatus according to claim 17, wherein a pair of images of a region corresponding to an identical coordinate position as the local region is obtained from teacher data.

20. The image processing apparatus according to claim 19, wherein a high definition image is generated by combining high definition images of each local region on a basis of a coordinate position of a local region.

21. The image processing apparatus according to claim 17, wherein a pair of images with the highest degree of similarity to an image of the local region is obtained from among a plurality of pairs of images extracted from the teacher data.

22. The image processing apparatus according to claim 17, wherein a pair of images corresponding to the local region is obtained from the teacher data on a basis of a motion vector set for a block included in the local region or on a basis of a motion vector referencing the block included in the local region.

23. The image processing apparatus according to claim 17, wherein a plurality of pairs of images corresponding to a plurality of regions is obtained from the teacher data on a basis of a position of the local region, and
wherein a number of time for learning to be performed is determined using each one of the plurality of pairs of images in generating the learning model on a basis of a degree of similarity between an image of the local region of the current image and each one of the plurality of pairs of images.

24. The image processing apparatus according to claim 23, wherein the plurality of regions includes a first region corresponding to a position of the local region and a second region adjacent to the first region.

25. The image processing apparatus according to claim 23, wherein the model generation unit does not perform learning using a pair of images with a degree of similarity is not performed with an image of the local region that is equal to or less than a threshold.

26. The image processing apparatus according to claim 1, wherein the first image group and the second image group are two image groups obtained by different image processing being executed on one image captured by one image sensor included in one image capture apparatus.

27. The image processing apparatus according to claim 1, wherein the first image group and the second image group are image groups captured by two different image sensors.

28. The image processing apparatus according to claim 1, wherein the first image group has a lower frame rate than the second image group.

29. An image processing method that uses a first image group to make an image of a second image group with fewer high frequency components than an image of the first image group high definition, comprising:
calculating a degree of similarity between a current image selected as a high definition target from the second image group and a previous image selected from the second image group which is a high definition target previous to the current image;
selecting, on a basis of the current image, teacher data to be used in learning from among a plurality of teacher data which use an image included in the first image group as one of a pair of images;
generating a learning model for making the current image high definition using the selected teacher data;
inferring high frequency components of the current image using the learning model generated in the generating when the degree of similarity is equal to or less than a threshold, and inferring high frequency components of the current image using a learning model used to make the previous image high definition when the degree of similarity is greater than the threshold; and
generating a high definition image on a basis of the current image and the high frequency components inferred in the inferring.

30. A non-transitory computer-readable storage medium storing a program for causing a computer to execute an image processing method that uses a first image group to make an image of a second image group with fewer high frequency components than an image of the first image group high definition, the method comprising:
calculating a degree of similarity between a current image selected as a high definition target from the second image group and a previous image selected from the second image group which is a high definition target previous to the current image;
selecting, on a basis of the current image, teacher data to be used in learning from among a plurality of teacher data which use an image included in the first image group as one of a pair of images;
generating a learning model for making the current image high definition using the selected teacher data;
inferring high frequency components of the current image using the learning model generated in the generating when the degree of similarity is equal to or less than a threshold, and inferring high frequency components of the current image using a learning model used to make the previous image high definition when the degree of similarity is greater than the threshold; and
generating a high definition image on a basis of the current image and the high frequency components inferred in the inferring.

* * * * *